(12) United States Patent
Boege et al.

(10) Patent No.: US 12,276,806 B2
(45) Date of Patent: Apr. 15, 2025

(54) APPARATUS AND METHODS FOR TRANSMITTING LIGHT

(71) Applicant: ILLUMINA, INC., San Diego, CA (US)

(72) Inventors: Steven Boege, San Mateo, CA (US); Simon Prince, Carlsbad, CA (US); Danilo Condello, New York, NY (US)

(73) Assignee: Illumina, Inc., San Diego, CA (US)

( * ) Notice: Subject to any disclaimer, the term of this patent is extended or adjusted under 35 U.S.C. 154(b) by 484 days.

(21) Appl. No.: 17/704,485

(22) Filed: Mar. 25, 2022

(65) Prior Publication Data

US 2022/0308354 A1 Sep. 29, 2022

Related U.S. Application Data

(60) Provisional application No. 63/273,778, filed on Oct. 29, 2021, provisional application No. 63/200,754, filed on Mar. 25, 2021.

(51) Int. Cl.

| | |
|---|---|
| *G02B 27/09* | (2006.01) |
| *G02B 19/00* | (2006.01) |
| *G02B 21/06* | (2006.01) |
| *G02B 27/30* | (2006.01) |
| *G02B 27/42* | (2006.01) |
| *G02B 27/48* | (2006.01) |

(52) U.S. Cl.
CPC ..... *G02B 27/0927* (2013.01); *G02B 19/0009* (2013.01); *G02B 21/06* (2013.01); *G02B 27/0916* (2013.01); *G02B 27/30* (2013.01); *G02B 27/425* (2013.01); *G02B 27/48* (2013.01)

(58) Field of Classification Search
CPC G02B 27/0927; G02B 21/06; G02B 19/0009; G02B 27/0916; G02B 27/30; G02B 27/0961; G02B 27/09
See application file for complete search history.

(56) References Cited

U.S. PATENT DOCUMENTS

| | | |
|---|---|---|
| 7,538,879 B2 | 5/2009 | Power |
| 8,314,407 B2 | 11/2012 | Van Dijk et al. |
| 2006/0273261 A1 | 12/2006 | Wolleschensky et al. |
| | (Continued) | |

FOREIGN PATENT DOCUMENTS

| | | |
|---|---|---|
| JP | 6385711 B2 | 9/2018 |
| KR | 10-1866825 B1 | 7/2018 |
| KR | 10-2019-0001631 A | 1/2019 |

*Primary Examiner* — Ryan D Howard
(74) *Attorney, Agent, or Firm* — Illumina, Inc.

(57) ABSTRACT

Apparatus and methods for transmitting light are disclosed. In an implementation, an apparatus includes a collimator at an input end positioned to receive an input beam from a fiber beam source and to produce a collimated beam. The apparatus further includes a beam shaping group having one or more optical elements and positioned to receive the collimated beam from the collimator and format the collimated beam into a shaped propagation beam having a substantially rectangular cross-section in a far field. The apparatus further includes an objective stage for optically probing a sample, such as a flow cell, using substantially rectangular cross-section sampling beam, where fluorescence from the sample is captured by a line sensor for detecting properties of the sample, such as chemical reactions therein.

25 Claims, 17 Drawing Sheets

(56) References Cited

U.S. PATENT DOCUMENTS

| | | |
|---|---|---|
| 2007/0076293 A1* | 4/2007 | Wolleschensky .. G02B 21/0052 359/385 |
| 2010/0264295 A1 | 10/2010 | Van Dijk et al. |
| 2015/0325980 A1 | 11/2015 | Fujita et al. |
| 2018/0164564 A1 | 6/2018 | Siebenmorgen |
| 2020/0117016 A1 | 4/2020 | Maeda et al. |
| 2020/0150446 A1 | 5/2020 | Thibon et al. |
| 2020/0209640 A1 | 7/2020 | Oulianov et al. |

* cited by examiner

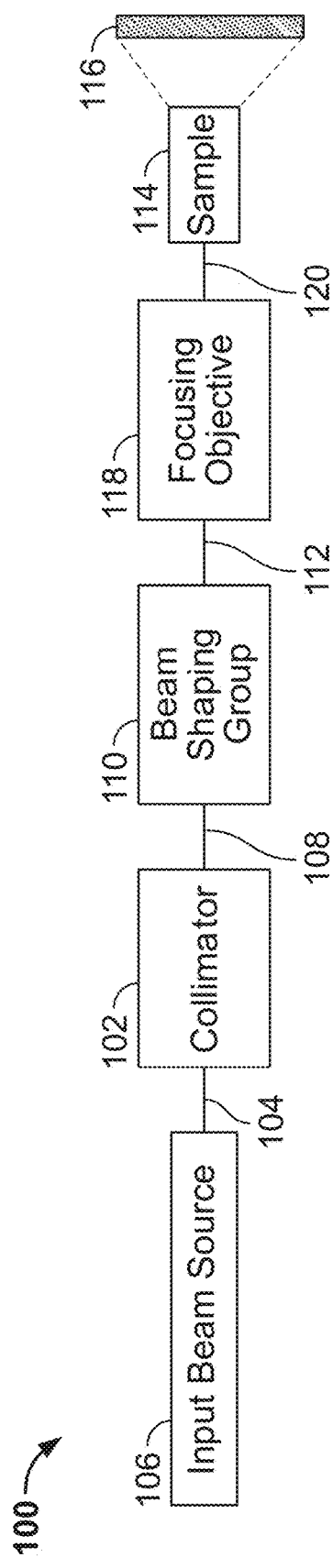
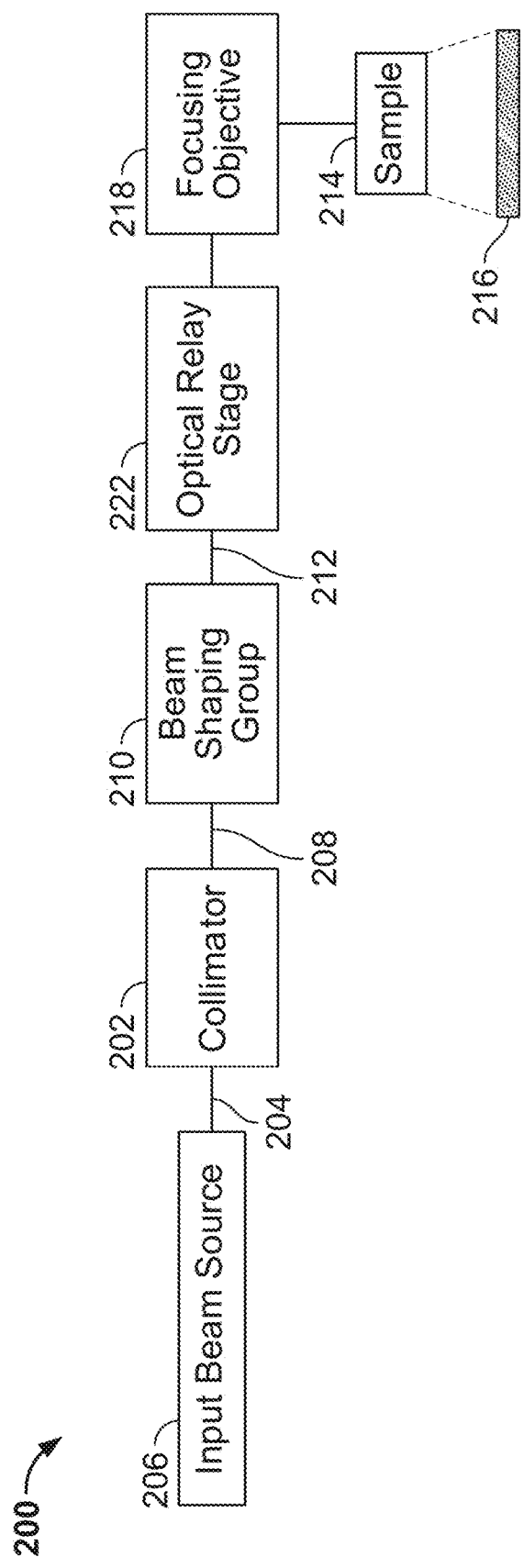

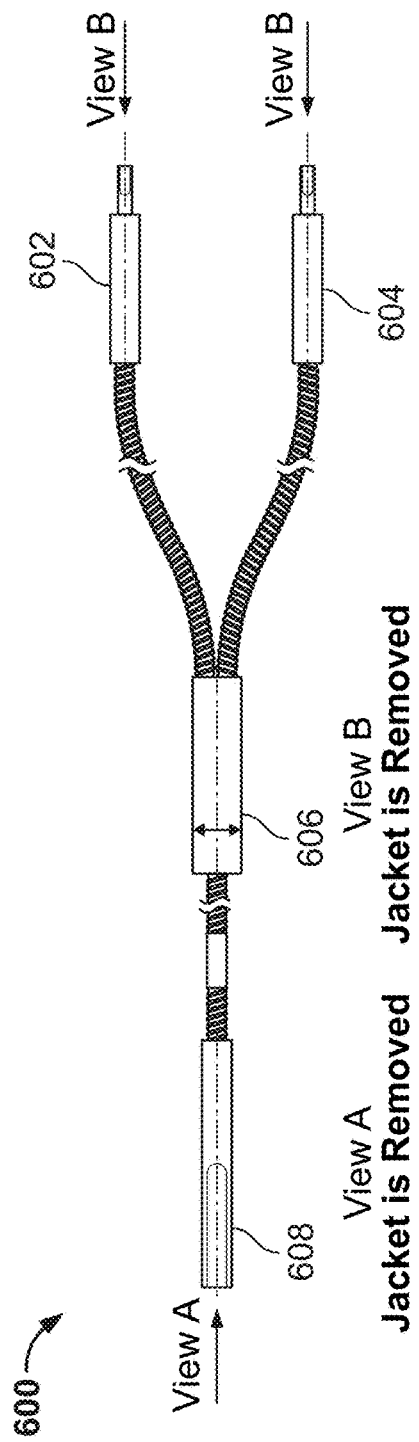
FIG. 8
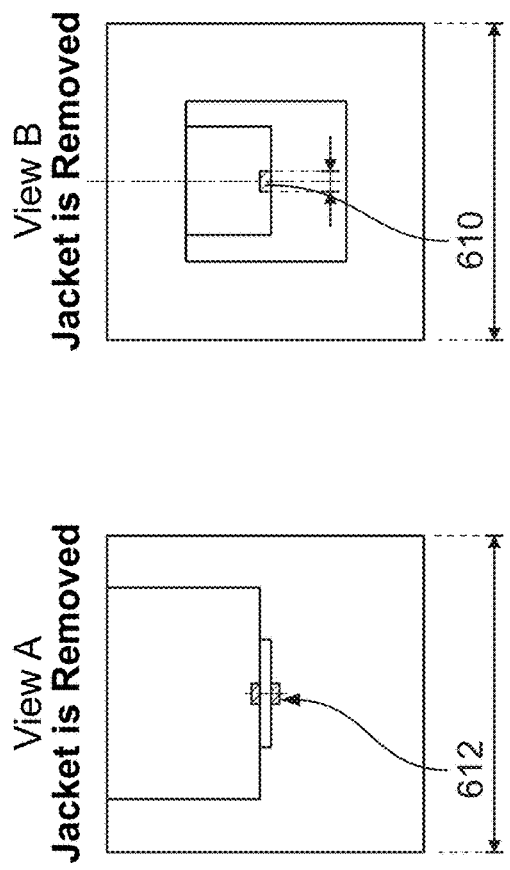
FIG. 9
FIG. 10

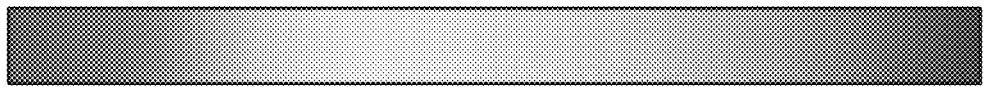
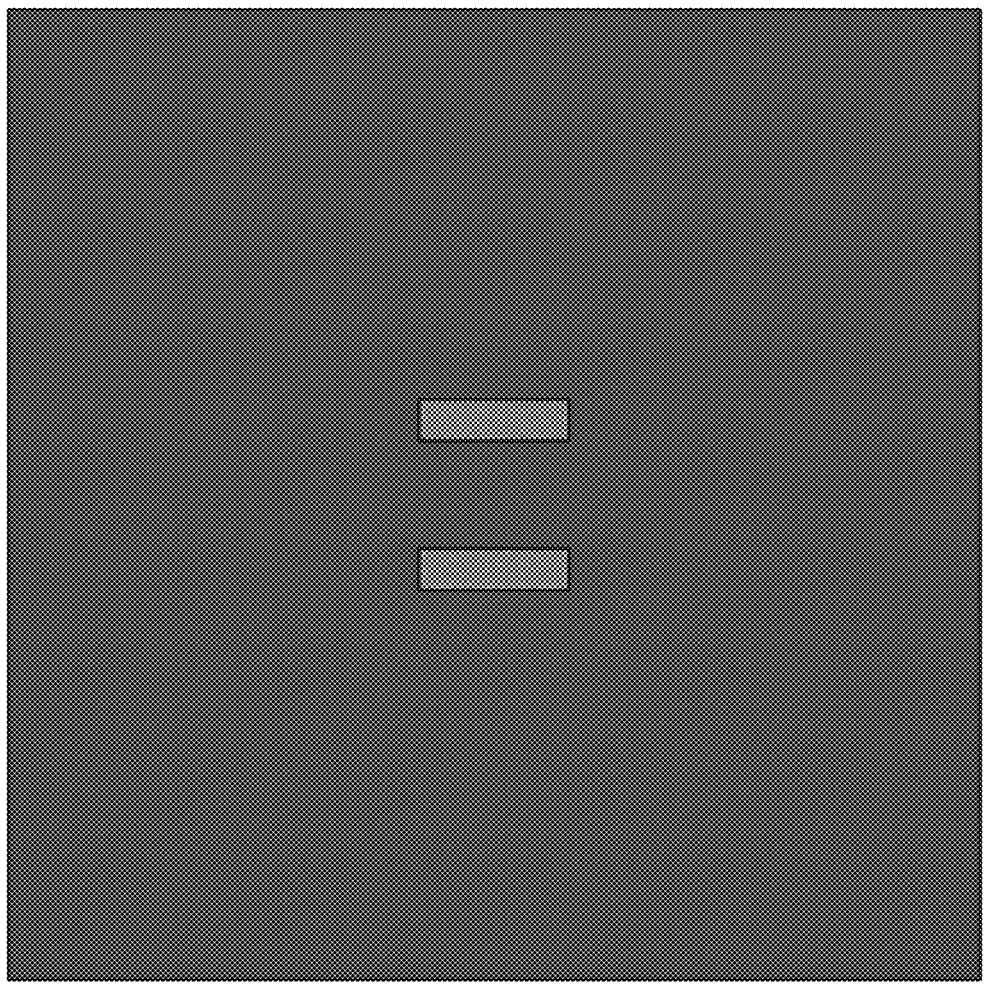
FIG. 11

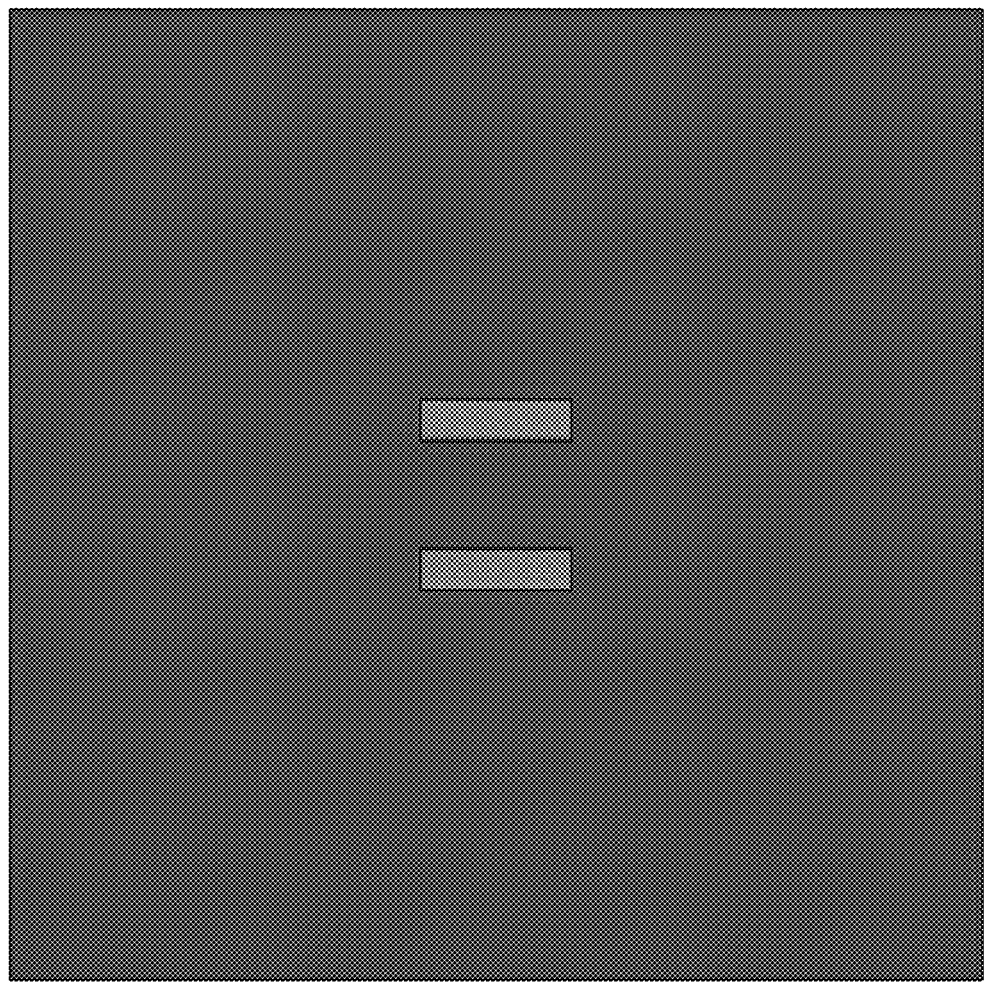
FIG. 15

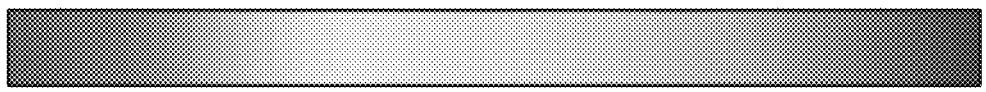
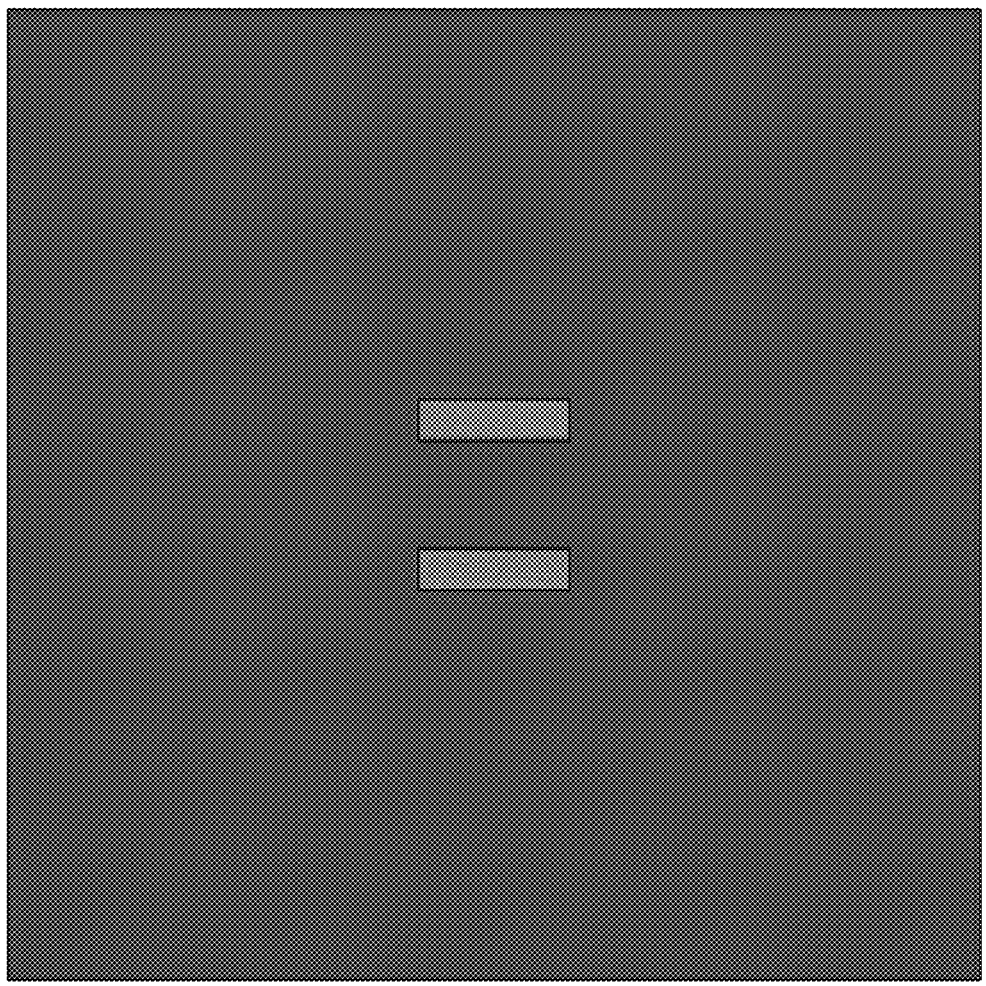
FIG. 16

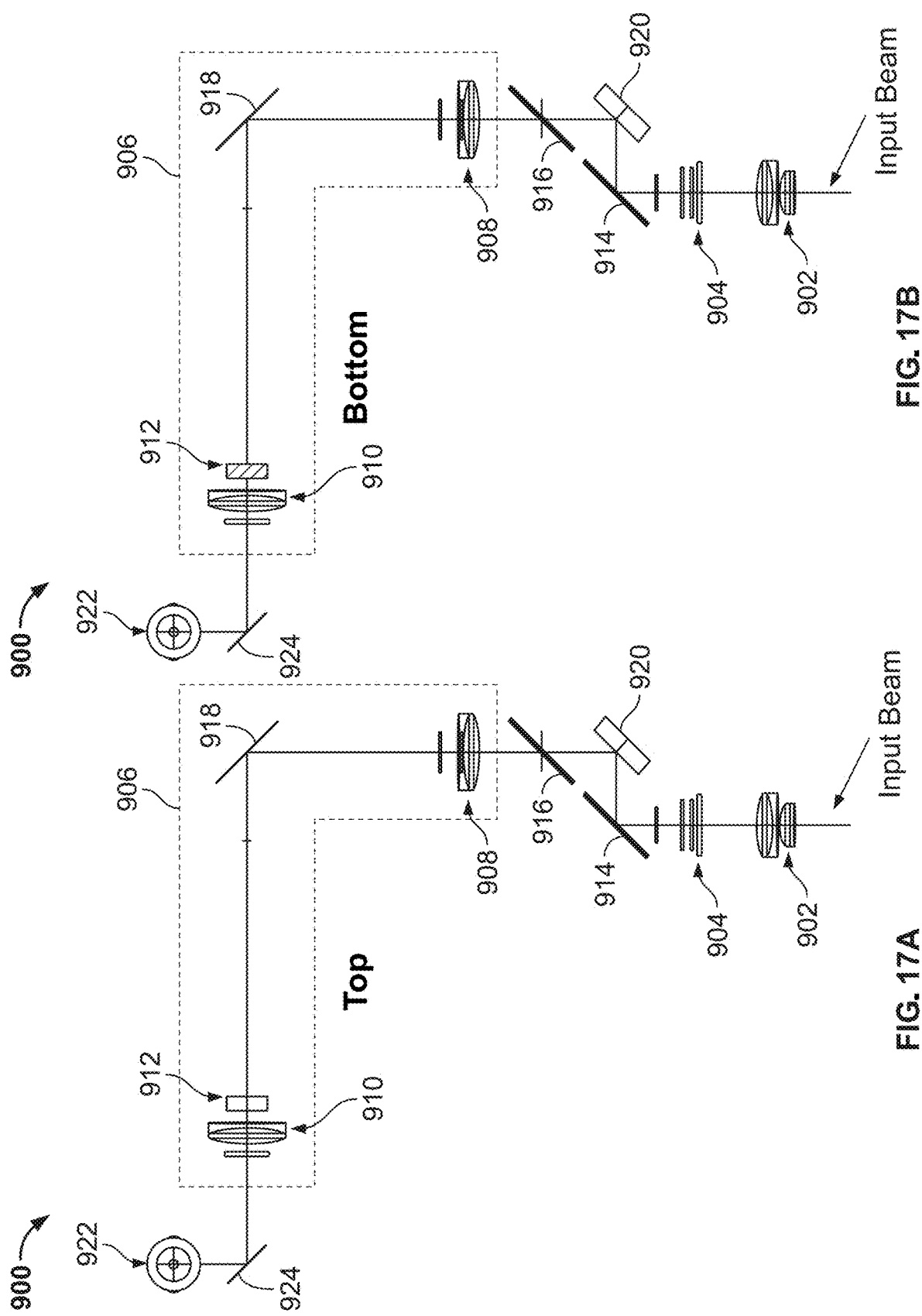

APPARATUS AND METHODS FOR TRANSMITTING LIGHT

RELATED APPLICATION

This application claims the benefit of and priority to U.S. Provisional Patent Application No. 63/200,754, filed Mar. 25, 2021 and U.S. Provisional Patent Application No. 63/273,778, filed Oct. 29, 2021, the content of each of which is incorporated by reference herein in their entireties and for all purposes.

BACKGROUND

Light formatting structures often need to be positioned many focal lengths away from microscope objectives with which they are paired. When these light formatting structures impart perturbations on light beams that result in divergence, the light beams can spread to an extent that elements of a paired microscope objective are overfilled. The microscope objectives clip the received light beam, as a result. This clipping can degrade uniformity of the formatted beam and create stray light that can be a source of noise in or damage to the overall imaging system.

SUMMARY

Advantages of the prior art can be overcome and benefits as described later in this disclosure can be achieved through the provision of apparatus and methods for transmitting light. Various implementations of the apparatus and methods are described below, and the apparatus and methods, including and excluding the additional implementations enumerated below, in any combination (provided these combinations are not inconsistent), may overcome these shortcomings and achieve the benefits described herein.

In accordance with a first implementation, an apparatus comprises or includes: a collimator at an input end positioned to receive an input beam from a fiber beam source and to produce a substantially collimated beam; a beam shaping group comprising or including one or more optical elements and positioned to receive the substantially collimated beam from the collimator and format the substantially collimated beam into a shaped propagation beam comprising or having a substantially rectangular cross-section in a far field; and a focusing objective stage comprising or including element apertures and an objective pupil for receiving the shaped propagation beam and positioned to transform the shaped propagation beam into a substantially rectangular cross-section sampling beam at or near a focal plane of the focusing objective stage for optically probing a sample.

In accordance with a second implementation, a method of optically probing a sample comprises or includes: generating a collimated beam from an input beam; formatting, using a beam shaping group, the collimated beam into a shaped propagation beam comprising or having a substantially rectangular cross-section in a far field; providing the shaped propagation beam to an optical relay stage producing the shaped propagation beam at an objective pupil of a focusing objective stage; transforming, using the focusing objective stage, the shaped propagation beam into a substantially rectangular cross-section sampling beam at a focal plane of the focusing objective stage; probing the sample at a first position for the focal plane; and affecting optical compensation of the optical relay stage such that the focusing objective stage transforms the shaped propagation beam into substantially rectangular cross-section sampling beam at a second position for the focal plane and probing the sample at the second position.

In accordance with a third implementation, a method comprises or includes: receiving, at a collimator, an input beam from a fiber beam source; producing, by the collimator, a substantially collimated beam from the input beam; receiving the substantially collimated beam from the collimator at a beam shaping group comprising or including one or more optical elements; formatting, by the beam shaping group, the substantially collimated beam into a shaped propagation beam comprising or having a substantially rectangular cross-section in a far field; and receiving the shaped propagation beam at a focusing objective stage comprising or including an objective pupil; transforming the shaped propagation beam into a substantially rectangular cross-section sampling beam at or near a focal plane of the focusing objective stage; and optically probing a sample using the focusing objective stage.

In further accordance with the foregoing first and/or second implementations, an apparatus and/or method may further include or comprise any one or more of the following:

In an implementation, the apparatus further comprises or includes: an optical relay stage positioned between the beam shaping group and the focusing objective stage for imaging the shaped propagation beam from the beam shaping group onto or near the objective pupil of the focusing objective stage.

In another implementation, the optical relay stage comprises or includes an input lens stage positioned to receive the shaped propagation beam from the beam shaping group and an output lens stage positioned to produce the shaped propagation beam to the objective pupil of the focusing objective stage.

In another implementation, the input lens stage and the output lens stage form a focusing element pair defining an intermediate image plane within the optical relay stage.

In another implementation, the optical relay stage comprising or having a beam affecting element at the intermediate image plane.

In another implementation, the beam affecting element is an optical mask.

In another implementation, the beam affecting element is a despeckling element.

In another implementation, a position of at least one of the input lens stage and the output lens stage is adjustable.

In another implementation, the apparatus further comprises or includes a Powell lens positioned before the optical relay stage.

In another implementation, the apparatus further comprises or includes a Lineman lens positioned before the optical relay stage.

In another implementation, the optical relay stage is afocal.

In another implementation, the optical relay stage is a fixed magnification relay.

In another implementation, the optical relay stage is a variable magnification relay.

In another implementation, the beam shaping group is an integrator.

In another implementation, the integrator is an imaging integrator formed of two arrays of microlenses positioned in series In another implementation, the integrator is an imaging integrator formed of two arrays of cylindrical microlenses positioned in series.

In another implementation, the integrator is a non-imaging integrator formed of one array of microlenses.

In another implementation, the integrator is a non-imaging integrator formed of microlenses that are cylindrical lenses.

In another implementation, the microlenses each comprise or have different focal lengths along an x-direction and along a y-direction.

In another implementation, the beam shaping group comprises or includes integral diffractive features.

In another implementation, the beam shaping group comprises or includes integral diffuser features.

In another implementation, the integrator is an imaging integrator formed of microlenses. The microlenses are cylindrical lenses.

In another implementation, the cylindrical lenses are configured to impose divergence in one axial direction of the microlenses and not in an orthogonal direction of the microlenses.

In another implementation, the beam shaping group comprises or includes one or more diffractive optical elements.

In another implementation, the beam shaping group comprises or includes a refractive optical element, a combination of a refractive optical element and a diffractive optical element, or a refractive optical element with integral diffractive or diffusive features.

In another implementation, the beam shaping group transforms the collimated beam into the shaped propagation beam comprising or having a uniform illumination in the far field over a rectangle comprising or having a ratio 8 to 1.

In another implementation, the beam shaping group transforms the collimated beam into the shaped propagation beam comprising or having a uniform illumination in the far field over a rectangle comprising or having a ratio of between about 10 to 1 and about 20 to 1.

In another implementation, the beam shaping group transforms the collimated beam into the shaped propagation beam comprising or having a uniform illumination in the far field over a rectangle comprising or having a ratio 24 to 1.

In another implementation, the beam shaping group transforms the collimated beam into the shaped propagation beam comprising or having a uniform illumination in the far field over a rectangle comprising or having a ratio that substantially matches a profile of a Time Delay and Integration (TDI) line sensor.

In another implementation, the apparatus further comprises or includes the fiber beam source.

In another implementation, the fiber beam source is a two-input beam source to generate the input beam comprising or having a first beam over a first wavelength range and comprising or having a second beam over a second wavelength range, different than the first wavelength range.

In another implementation, the fiber beam source comprises or includes two dedicated input fibers each corresponding to one of the first beam and the second beam.

In another implementation, each input fiber comprises or has a substantially rectangular cross-section at an exit face.

In another implementation, the fiber beam source is a light pipe.

In another implementation, the apparatus comprises or includes an optical compensator positioned to receive the shaped propagation beam and comprising or having two compensation positions, a first compensation position such that the focusing objective stage is to produce the substantially rectangular cross-section sampling beam to probe an upper surface of the sample and a second compensation position such that the focusing objective stage is to produce the substantially rectangular cross-section sampling beam to probe a bottom surface of the sample.

In another implementation, the optical compensator is electro-mechanically controllable between the first compensation position and the second compensation position.

In another implementation, the optical compensator is electrically controllable between the first compensation position and the second compensation position.

In another implementation, the optical compensator is insertable between the beam shaping group and the focusing objective stage.

In another implementation, the apparatus comprises or includes an optical relay stage positioned between the beam shaping group and the focusing objective stage. The optical relay stage comprising or including an input lens stage positioned to receive the shaped propagation beam from the beam shaping group and an output lens stage positioned to produce the shaped propagation beam to the objective pupil of the focusing objective stage. The optical compensator is positioned within the optical relay stage.

In another implementation, the optical compensator is an optical element electrically controllable to switch from a first optical state to a second optical state to affect optical compensation.

In another implementation, the apparatus comprises or includes an optical relay stage positioned between the beam shaping group and the focusing objective stage. The optical relay stage comprising or including an input lens stage positioned to receive the shaped propagation beam from the beam shaping group and an output lens stage positioned to produce the shaped propagation beam to the objective pupil of the focusing objective stage. The optical compensator is positioned before the optical relay stage.

In another implementation, the apparatus comprises or includes an optical relay stage positioned between the beam shaping group and the focusing objective stage. The optical relay stage comprising or including an input lens stage positioned to receive the shaped propagation beam from the beam shaping group and an output lens stage positioned to produce the shaped propagation beam to the objective pupil of the focusing objective stage. The optical compensator is positioned after the optical relay stage.

In another implementation, the apparatus comprises or includes an optical compensator; and a positioner coupled to the optical compensator to controllably (i) insert the optical compensator into a beam path for receiving the shaped propagation beam and for affecting the shaped propagation beam path to probe one of an upper surface or a lower surface of the sample and (ii) remove the optical compensator from the beam path for affecting the shaped propagation beam path to probe the other of the lower surface or upper surface of the sample.

In another implementation, the optical compensator is a plane-parallel plate of refractive material.

In another implementation, the optical compensator is a lens.

In another implementation, the optical compensator is inserted before an optical relay stage in the beam path.

In another implementation, the optical compensator is inserted within an optical relay stage in the beam path.

In another implementation, the optical compensator is inserted after an optical relay stage in the beam.

In another implementation, the apparatus comprises or includes an optical relay stage positioned between the beam shaping group and the focusing objective stage. The optical relay stage comprising an input lens stage positioned to receive the shaped propagation beam from the beam shaping group and an output lens stage positioned to produce the shaped propagation beam to the objective pupil of the focusing objective stage. The input lens stage is movable between a first position such that the focusing objective stage is to produce the substantially rectangular cross-section sampling beam to probe an upper surface of the sample and a second position such that the focusing objective stage is to produce the substantially rectangular cross-section sampling beam to probe a bottom surface of the sample.

In another implementation, the apparatus comprises or includes an optical relay stage positioned between the beam shaping group and the focusing objective stage, the optical relay stage comprising an input lens stage positioned to receive the shaped propagation beam from the beam shaping group and an output lens stage positioned to produce the shaped propagation beam to the objective pupil of the focusing objective stage, wherein the output lens stage is movable between a first position such that the focusing objective stage is to produce the substantially rectangular cross-section sampling beam to probe an upper surface of the sample and a second position such that the focusing objective stage is to produce the substantially rectangular cross-section sampling beam to probe a bottom surface of the sample.

In another implementation, the apparatus comprises or includes the fiber beam source. The apparatus comprising or having a first spacing distance between the collimator and the fiber beam source to produce the substantially rectangular cross-section sampling beam to probe an upper surface of the sample and comprising or having a second spacing distance between the collimator and the fiber beam source to produce the substantially rectangular cross-section sampling beam to probe a bottom surface of the sample.

In another implementation, affecting optical compensation of the optical relay stage comprises or includes adjusting a position or an optical property of an affecting element within the optical relay stage.

In another implementation, the beam shaping group comprises two arrays of microlenses.

In another implementation, the beam shaping group comprises a diffractive optical element.

In another implementation, the beam shaping group comprises or includes a refractive optical element, a combination of a refractive optical element and a diffractive optical element, or a refractive optical element with integral diffractive features.

In another implementation, the beam shaping group transforms the collimated beam into the shaped propagation beam comprising or having a uniform illumination in the far field over a rectangle comprising or having a ratio 8 to 1.

In another implementation, the beam shaping group transforms the collimated beam into the shaped propagation beam comprising or having a uniform illumination in the far field over a rectangle comprising or having a ratio of between about 10 to 1 and about 20 to 1.

In another implementation, the beam shaping group transforms the collimated beam into the shaped propagation beam comprising or having a uniform illumination in the far field over a rectangle comprising or having a ratio 24 to 1.

In another implementation, generating the input beam comprises or includes generating the input beam comprising or having a first beam over a first wavelength range and comprising or having a second beam over a second wavelength range, different than the first wavelength range.

In another implementation, generating the input beam comprises or includes generating the input beam using a two-input beam source.

In another implementation, the fiber beam source comprises or includes two dedicated input fibers each corresponding to one of the first beam and the second beam.

In another implementation, output ends of the two dedicated input fibers are presented to the collimator with fixed spacing and with rotation about fiber cores and a collimator axis.

In another implementation, affecting optical compensation of the optical relay stage comprises or includes adjusting a position or an optical property of an affecting element within the optical relay stage.

In another implementation, the beam shaping group comprises or includes two arrays of microlenses.

In another implementation, the beam shaping group comprises or includes a diffractive optical element.

In another implementation, the beam shaping group comprises or includes a refractive optical element, a combination of a refractive optical element and a diffractive optical element, or a refractive optical element with integral diffractive features.

In another implementation, the beam shaping group transforms the collimated beam into the shaped propagation beam comprising or having a uniform illumination in the far field over a rectangle comprising or having a ratio 8 to 1.

In another implementation, the beam shaping group transforms the collimated beam into the shaped propagation beam comprising or having a uniform illumination in the far field over a rectangle having a ratio 10 to 1.

In another implementation, the beam shaping group transforms the collimated beam into the shaped propagation beam comprising or having a uniform illumination in the far field over a rectangle comprising or having a ratio 24 to 1.

In another implementation, the beam shaping group transforms the collimated beam into the shaped propagation beam having a uniform illumination in the far field over a rectangle having a ratio of between about 10 to 1 and about 20 to 1.

In another implementation, the beam shaping group transforms the collimated beam into the shaped propagation beam having a uniform illumination in the far field over a rectangle having a ratio of approximately 1.

In another implementation, the method includes generating the input beam having a first beam over a first wavelength range and having a second beam over a second wavelength range, different than the first wavelength range.

In another implementation, the method includes generating the input beam using a two-input beam source.

It should be appreciated that all combinations of the foregoing concepts and additional concepts discussed in greater detail below (provided such concepts are not mutually inconsistent) are contemplated as being part of the subject matter disclosed herein and/or may be combined to achieve the particular benefits of a particular aspect. In particular, all combinations of claimed subject matter appearing at the end of this disclosure are contemplated as being part of the subject matter disclosed herein.

BRIEF DESCRIPTION OF THE DRAWINGS

FIG. 1 illustrates a schematic diagram of an implementation of an optical imager apparatus in accordance with the teachings of this disclosure, showing a beam shaping group and collimator.

FIG. 2 illustrates a schematic diagram of another implementation of an optical imager apparatus in accordance with the teachings of this disclosure, showing a beam shaping group, collimator, and optical relay stage.

FIG. 8 illustrates an implementation of an input fiber beam source in accordance with the teachings of this disclosure.

FIG. 9 illustrates a cross-section of an implementation of a combined fiber bundle exit face in accordance with the teachings of this disclosure.

FIG. 10 illustrates a cross-section of an implementation of entrance faces of a combined fiber bundle in accordance with the teachings of this disclosure.

FIG. 11 illustrates a cross-section of an intensity profile of a substantially rectangular beam pair in a sample in accordance with the teachings of this disclosure.

FIG. 15 illustrates an intensity profile of substantially rectangular cross-section beams in an upper region of a sample shown in watts per square millimeter in accordance with the teachings of this disclosure.

FIG. 16 illustrates an intensity profile of substantially rectangular cross-section beams in a bottom region of a sample shown in watts per square millimeter in accordance with the teachings of this disclosure.

FIGS. 17A and 17B illustrate an optical imager apparatus with a compensator in two different positions, respectively for an implementation in accordance with the teachings of this disclosure.

DETAILED DESCRIPTION

Although the following text discloses a detailed description of implementations of methods, apparatuses and/or articles of manufacture, it should be understood that the legal scope of the property right is defined by the words of the claims set forth at the end of this patent. Accordingly, the following detailed description is to be construed as examples only and does not describe every possible implementation, as describing every possible implementation would be impractical, if not impossible. Numerous alternative implementations could be implemented, using either current technology or technology developed after the filing date of this patent. It is envisioned that such alternative implementations would still fall within the scope of the claims.

At least one aspect of this disclosure is directed toward an apparatus, in particular an optical imager, for use with a system that can be used to perform an analysis on one or more samples of interest. The sample may include one or more DNA clusters, such as a DNA cluster that has been linearized to form a single stranded DNA (sstDNA). In various examples, the apparatus is designed to receive an input beam from a beam source and covert that input beam into a substantially rectangular cross-section sampling beam for probing the sample. In this way, an apparatus is able to probe a sample using a uniform illumination in the sample that considers the shape of various types of photodetectors used in flow cell applications, such as time delay and integration (TDI) line scanners. The TDI line scanners may have a footprint with an aspect ratio of between about 10 to 1 and about 20 to 1. The TDI line scanners may alternatively have a footprint with an aspect ratio of approximately 1, about 4 to 3, and/or about 16 to 9. Other aspect ratios may prove suitable. The TDI line scanners may use cylindrical lens arrays and/or spherical lens arrays. In addition, power density for the excitation illumination can be made more uniform over the area to be illuminated. Such an arrangement may advantageously reduce photobleaching or other photodamage to a sample of interest, one or more reagents used for performing chemical reactions, and/or a substrate used to support a sample of interest. In addition, such an arrangement may advantageously permit such an optical system to operate at an increased speed as a substantially more uniform excitation illumination may result in the edges of an area of the excitation illumination. While examples are described herein as generating substantially rectangular cross-section sampling beams, the present techniques may be used to form any number of elongated cross-section geometries in a far field, including ellipses, parallelograms, etc.

Figure 3:
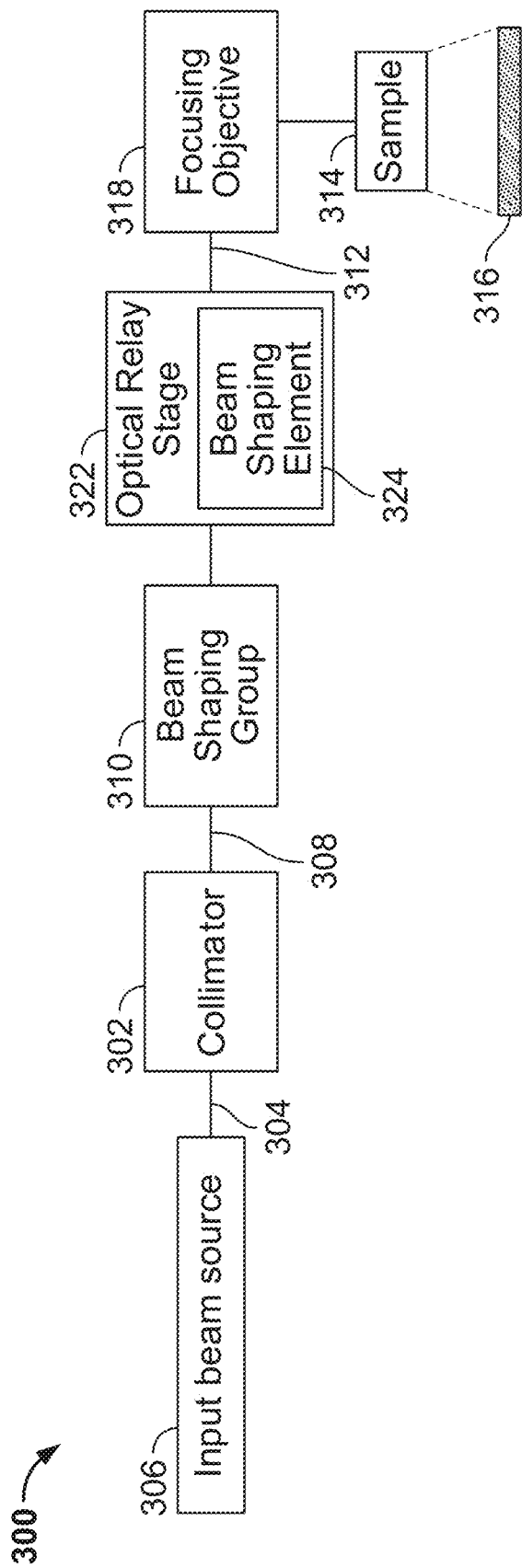
FIG. 3 illustrates a schematic diagram of another implementation of an optical imager apparatus in accordance with the teachings of this disclosure, showing a beam shaping group, collimator, and optical relay stage with internal beam shaping element.

FIGS. 1-3 illustrate various schematic diagrams of example implementations of the techniques herein. FIG. 1 illustrates an optical imager apparatus 100 that, in accordance with an example, includes a collimator stage 102 positioned to receive an input beam 104 generated by an input beam source 106. The collimator stage 102, which may be implemented as an optical collimator formed of a lens or a grouping of lenses, generates a substantially collimated propagation beam 108 from the input beam 104.

The apparatus 100 further includes a beam shaping group 110 that includes one or more optical elements and is positioned to receive the collimated beam 108 from the collimator stage 102. In various examples, the beam shaping group 110 is designed to format the collimated beam into a shaped propagation beam 112 having a substantially rectangular cross-section in a far field to allow for probing of a sample 114 using a uniform intensity beam profile 116 that coincides with the profile of a line scanning sensor to be used in flow cell applications. To focus the shaped propagation beam onto the sample, a focusing objective stage 118 is provided between the beam shaping group 110 and the sample 114.

While not shown, the focusing objective stage 118 has an objective pupil and is positioned to receive the shaped propagation beam 112 such that the objective pupil is not overfilled, in some examples, that is, not clipped by the objective pupil or other apertures within the objective stage 118. In various examples, the objective pupil is additionally uniformly illuminated. The focusing objective stage 118 transforms the beam 112 into a substantially rectangular cross-section sampling beam 120 at a focal plane of the focusing objective stage and having a substantially rectangular beam profile such as profile 116.

FIG. 2 illustrates another example optical imager apparatus 200 having similar elements to that of the apparatus 100. The apparatus 200 includes a collimator stage 202 positioned to receive an input beam 204 generated by an input beam source 206. Similar to the collimator stage 102, the collimator stage 202 generates a substantially collimated propagation beam 208 from the input beam 204.

A beam shaping group 210 is also provided for receiving a collimated beam 208 from the collimator stage 202 and for formatting the collimated beam into a shaped propagation beam 212 having a substantially rectangular cross-section in a far field to allow for probing of a sample 214 using a uniform intensity beam profile 216 that coincides with the profile of a line scanning sensor to be used in flow cell applications. A focusing objective stage 218 is also provided, but unlike the apparatus 100, the apparatus 200 includes an optical relay stage 222 positioned between the beam shaping group 210 and the focusing objective stage 218. The optical relay stage 220 functions to relay the shaped propagation beam onto the pupil of the focusing objective stage or a proximal plane therein, where in various examples herein the optical relay stage is formed of an input lens stage positioned to receive the propagation beam from the beam shaping group 210 and an output lens stage positioned to produce or provide the shaped propagation beam on or near the objective pupil. The optical relay stage may be afocal, in which case an object at infinity would be focused at the focal plane of an objective. The optical relay stage may optionally be not quite afocal, in which case an object at infinity would be focused not quite at the focal plane of the objective. In the implementation of FIG. 2, the beam shaping group 210 is external to the optical relay stage. In some examples, a beam shaping group may be partially or entirely within an optical relay stage.

FIG. 3 illustrates an example optical imager apparatus 300 having elements similar to those of FIG. 2, and bearing similar reference numerals, but in which, in addition to the beam shaping group 310 before the optical relay stage 322, there is a beam shaping element 324 positioned within the optical relay stage 322, e.g., between an input lens stage and an output lens stage thereof. In some examples, a second beam shaping group, different than the group 310, may be positioned within the optical relay stage 320.

Figure 4:
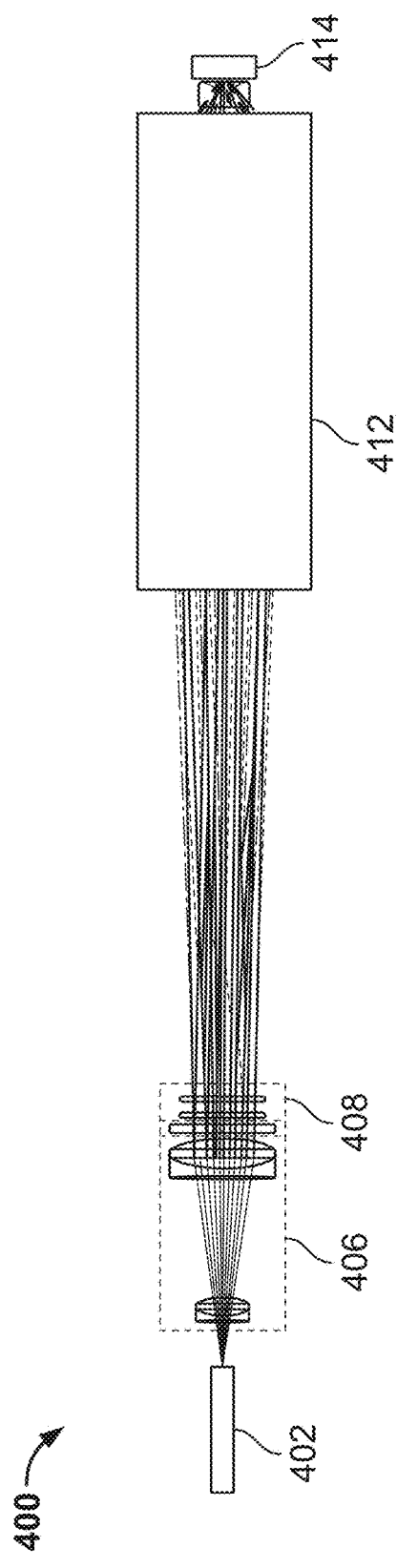
FIG. 4 illustrates a schematic diagram showing optical components for an implementation of an optical imager apparatus in accordance with the teachings of this disclosure.
Figure 5:
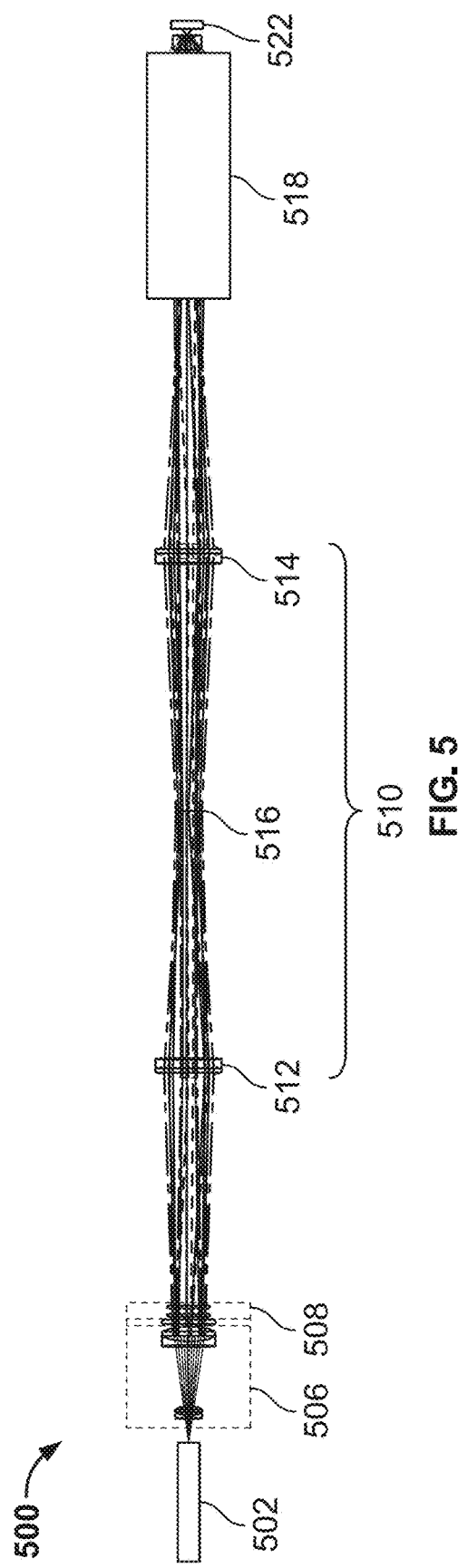
FIG. 5 illustrates a schematic diagram showing optical components for another implementation of an optical imager apparatus in accordance with the teachings of this disclosure.

To generate a shaped propagation beam having a substantially rectangular cross-section in a far field, various types of beam shaping groups may be deployed. FIGS. 4 and 5 illustrate two example configurations of an optical image apparatus, each having a beam shaping group formed of an integrator. In some examples, including those illustrated in FIGS. 4 and 5 the integrator is an imaging integrator, formed of two arrays of cylindrical microlenses positioned in series. The microlenses may not be cylindrical in other implementations, however. In other examples, the integrator is a non-imaging integrator formed of one array of cylindrical microlenses. In yet other examples, the beam shaping group may be one or more diffractive optical elements or one or more refractive optical elements. In yet other examples, the beam shaping group may be a combination of a refractive optical element and a diffractive optical element, or a refractive optical element with integral diffractive features (such as with integral diffuser). In some examples, the beam shaping group is configured to receive an input beam from a beam source having a substantially rectangular shape, such as from one or more rectangular shaped exit face optical fibers (as shown in FIGS. 8-10). The exit face of the optical fibers may be have a square cross-section, a round cross-section, or another cross-section. The beam shaping group 310 may be omitted in some implementations if the exit face of the optical fibers has a square cross-section. The beam shaping group 310 may be included in some implementations if the exit face of the optical fibers has a round cross-section.

FIG. 4 illustrates an optical imager apparatus 400 having an input beam source, in the form of an input fiber beam source 402 producing an expanding beam output from an exit face thereof. The beam sources herein may be rigid fibers, light pipes, or other mode confinement-based laser beam sources. The input to the input fiber beam source 402 may be a laser, a light emitting diode, or other illumination excitation source. A collimator 406 is positioned to receive the input beam positioned to generate a generally collimated beam at an exit thereof.

Figure 7:
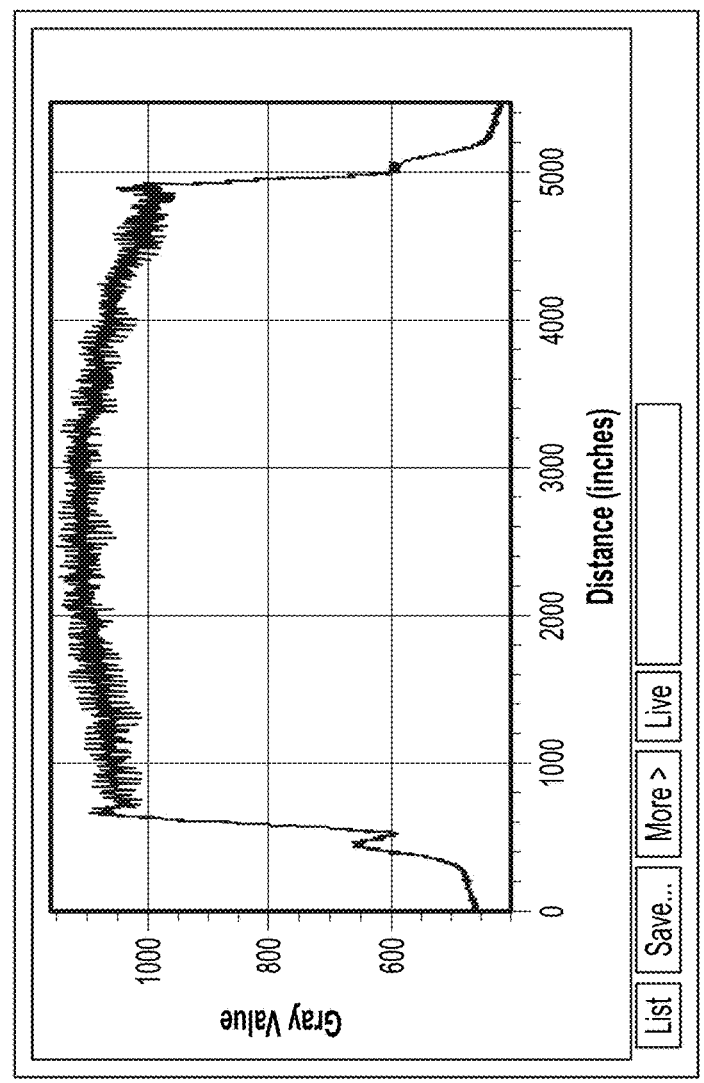
FIG. 7 is a plot of illumination profile image of a substantially rectangular cross-section beam profile generated by a beam shaping group in accordance with the teachings of this disclosure.

Adjacent the collimator 406 is a beam shaping group 408, which in this example is a two-element imaging integrator that formats the collimated input beam into a shaped propagation beam having a substantially rectangular cross-section in a far field as shown in, for example, FIG. 7 where an imaging integrator was used to convert the output beam of a fiber comprising a core having a 4:1 aspect ratio into the substantially rectangular cross section (having a 12:1 aspect ratio) recorded in the laboratory. The beam shaping group 408 feeds the shaped propagation beam to a focusing objective stage 412 to probe a sample 414.

Figure 6:
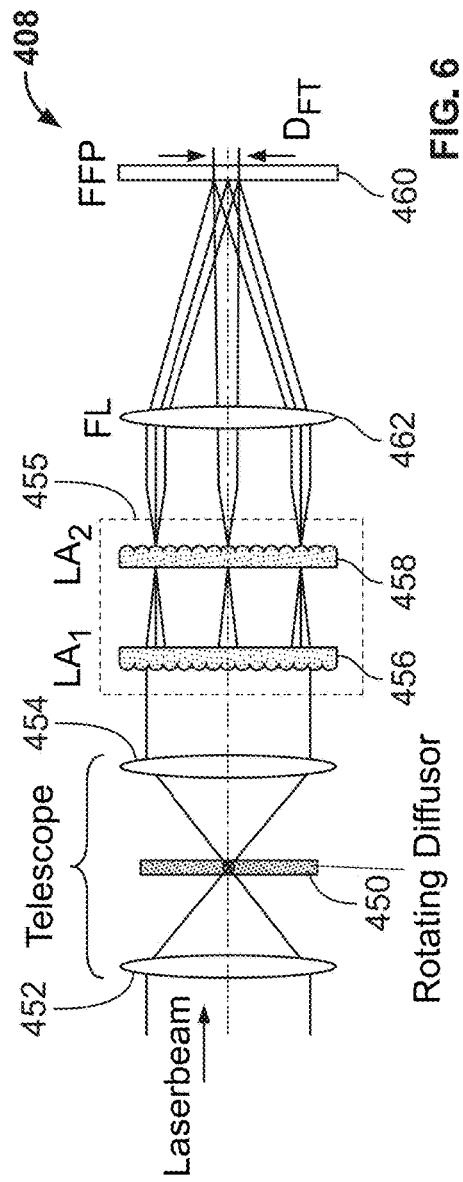
FIG. 6 illustrates a schematic diagram of an implementation of a beam shaping group in accordance with the teachings of this disclosure.

FIG. 6 illustrates a schematic of an example configuration of the beam shaping group 408. A collimated beam is received to a telescope that includes an input lens 452 and an output lens 454 and a rotating diffuser 450 that introduces a time-dependent variation to a speckle pattern. Adjacent the telescope, an imaging integrator 455 is formed of two cylindrical microlens arrays, 456 ($LA_1$( ) and 458 ($LA_2$), generating a substantially rectangular cross-section beam at a far field plane, FFP 460, which corresponds to the focal plane of a focusing objective when focused using an focusing objective, 462 (FL). In the illustrated example, the microlens are on opposing sides of the respective microlens arrays 456 and 458. In any case, in some examples, the beam shaping group 408 is formed of only the two cylindrical microlens arrays 456 and 458.

FIG. 7 illustrates an intensity profile of a substantially rectangular cross-section beam as measured by a sensor positioned at the far field plane, FFP, along with a plot of intensity as a function of lateral distance of that beam profile. While not shown, in some examples, the beam shaping group 408 may be a non-imaging integrator formed of a single, one-sided cylindrical microlens array.

Whereas FIG. 4 illustrates an optical imager formed of a collimator, beam shaping group, and focusing objective stage only, in configurations like that of apparatus 100, FIG. 5 illustrates an optical imager apparatus 500 having an optical relay stage as an example configuration like that of apparatus 200. A fiber beam source 502 feeds an input signal to a collimator 506, where a beam shaping group 508 is positioned adjacent to the collimator 506 to generate a shaped propagation beam from an incident collimated beam. In the illustrated example, the beam shaping group 508 is an imaging integrator formed of two cylindrical microlens arrays, similar to the beam shaping group 408 in FIG. 4. That is, in some examples, the beam shaping group 408 may be formed of only the two cylindrical microlens arrays 456 and 458. An optical relay stage 510 is formed of two lens groups 512, 514. Input lens stage 512 receives that shaped propagation beam and generates an intermediate image of the input plane (i.e., of the fiber output facet) at an intermediate image plane 516. Output lens stage 514 generates the output from the optical relay stage 510 and provides that output to a focusing objective stage 518 for probing the sample 522. The optical relay stage 510 may be advantageous for production apparatuses that may have variations in manufacturing tolerances and/or may be paired with different components or arrangements. That is, the beam shaping group 508 may be designed or configured for a particular shaped propagation beam at a predetermined distance and, if the objective pupil of the focusing objective stage 518 is not at that particular predetermined distance, the optical relay stage 510 can be used to relay the shaped propagation beam to the actual location of the objective pupil of the focusing objective stage 518. In addition or in lieu of the foregoing, the optical relay stage 510 may further transform the particular shaped propagation beam such that a beam shaping group arrangement can be used with different detection sensors by modifying how the optical relay stage 510 further transforms the particular propagation beam.

The beam shaping group 508, as well as in various other examples herein, is designed to format an incident collimated beam to have different sizes at a far field in orthogonal directions. Some beam shaping groups may comprise cylindrical microlens array. Other beam shaping groups may comprise anamorphic relays composed of cylindrical lenses. The result is that the beam profile at the far field where the sample is positioned (as well as the beam profile at the intermediate plane for the optical relay configured of FIG. 5) will have a footprint in one plane (e.g., the XZ plane) and a different footprint in another, orthogonal plane (e.g., the YZ plane). The pitch, focal length, and shape of the lenslets can be selected to further control the beam profile at the focal planes, as can the position of the microlens such as whether they are on opposite sides of optics or not.

In various examples, a beam affecting element, such as an optical mask or despeckling element may be positioned on the intermediate plane to establish greater uniformity of illumination across the substantially rectangular cross-section beam at the far field. As a mask, the beam affecting element can be used to ensure that the illumination pattern is substantially matched to the field of view of an imager so that regions of the sample are only illuminated while being imaged, for example. As a despeckling element, a rotating diffuser disk or a low-divergence beam-shaping element may be used and moved in one direction to affect the beam. In various examples, the beam affecting element may be placed elsewhere within the optical relay stage 510.

In various examples, the beam source is a fiber beam source and more specifically a two-input beam source that generates an input beam having a first beam over a first wavelength range and a second beam over a second wavelength range, different than the first wavelength range.

FIG. 8 illustrates an example fiber beam source 600, according to an example configuration. The beam source 600 is formed by bringing together two input fibers 602 and 604, forming a bifurcated fiber bundle. In examples, either or both of the input fibers 602, 604 may receive an input beam at any suitable wavelength for flow cell probing applications, e.g., 455 nm, 488 nm, 532 nm, 660 nm, 780 nm, or 790 nm. In various implementations, the input beam may be over any range of wavelengths from 200-2500 nm. An entrance face 610 end view of each fiber 602, 604 is shown in FIG. 10, which indicates that for this example, the entrance faces are substantially rectangular. A Y-combiner 606 is provided to align the fibers to overlay one another and form the two-input beam source 608 having an exit surface profile formed of two substantially rectangular faces 612, as shown in FIG. 9. As noted, in some examples, the input beam is generated from substantially rectangular fiber faces, although this need not be the case. Further, the aspect ratio of the fiber face will not necessarily be the same as that desired at the far field where the sample is to be probed. Either way the beam shaping group is configured to produce the substantially rectangular beam. To illustrate the uniformity of a far field illumination, an example Zemax image of a generated sample beam, formed of two input beam fibers is shown in FIG. 11, which shows consistent illumination across the entire profile. The techniques may be implemented with other fiber configurations and/or with other fiber cross-sectional profiles. For example, in other implementations, more than two fibers could be used and could be in other locations than symmetric about a centerline. For example, 3×1, 6×1, 2×2 or 3 fibers on a hex pack can be used.

Figure 12:
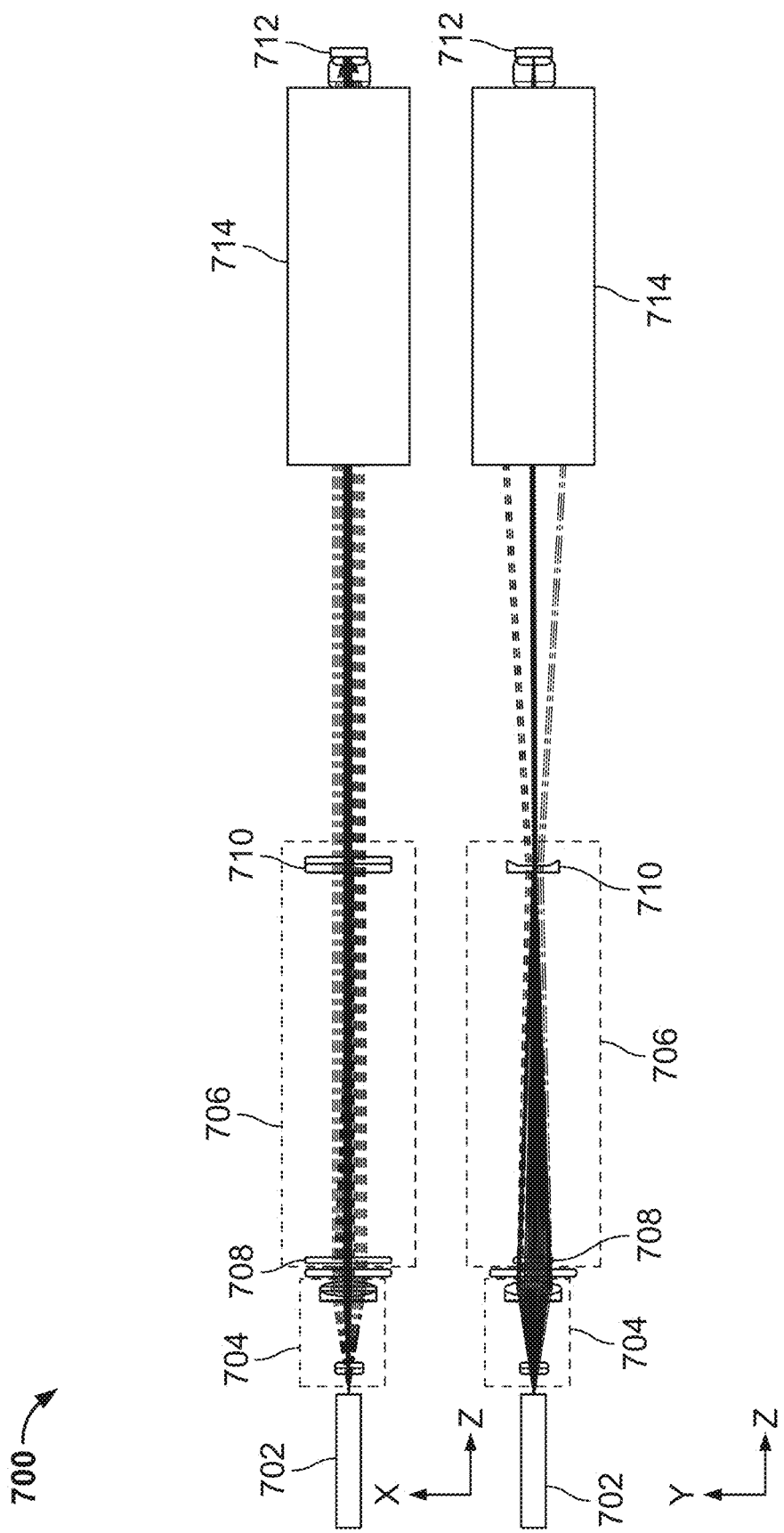
FIG. 12 illustrates optical components for another implementation of an optical imager apparatus in accordance with the teachings of this disclosure.
Figure 13:
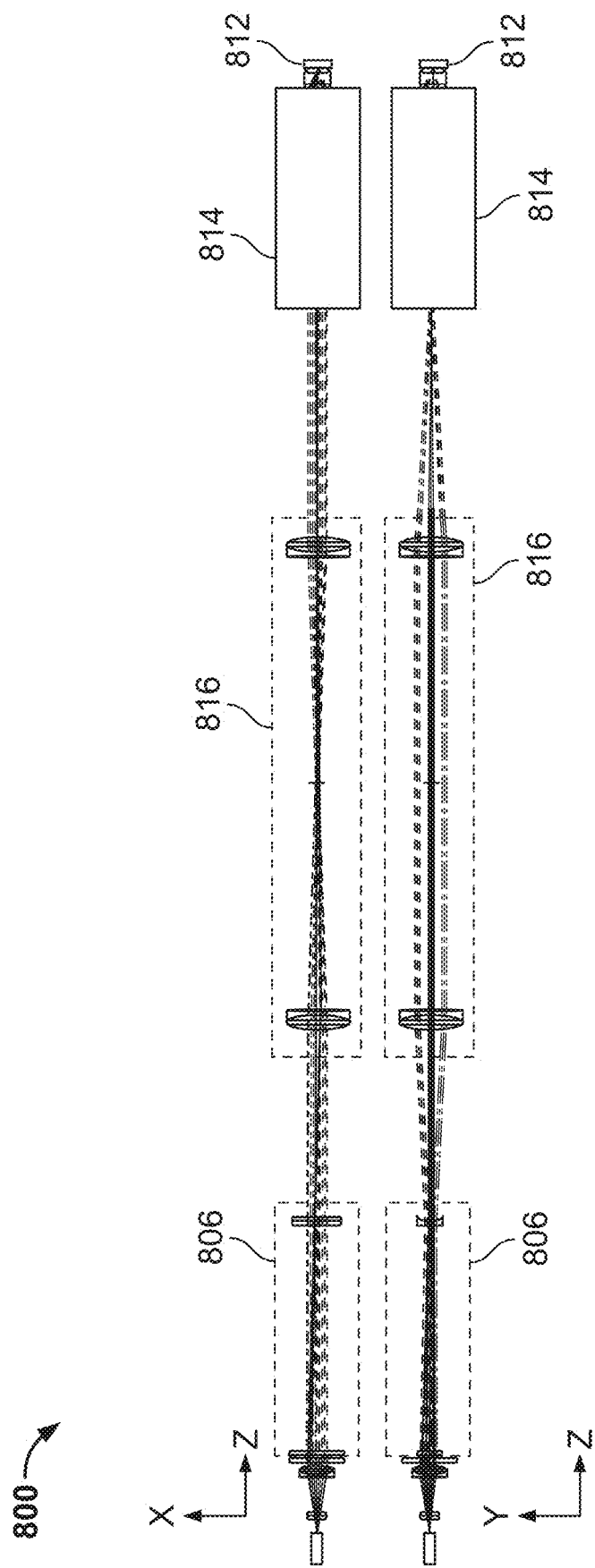
FIG. 13 illustrates optical components for another implementation of an optical imager apparatus in accordance with the teachings of this disclosure.

FIGS. 12 and 13 illustrate other example optical image apparatus configurations having beam shaping groups composed of optical groupings other than microlens arrays. FIG. 12 illustrates views from two perspectives (the top view is looking down at an XZ plane view and the bottom view is looking down at an YZ plane view) of an apparatus 700 coupled to an input fiber beam source 702. A collimator group 704 feeds a collimated beam to a beam shaping group 706. The beam shaping group may be formed of cylindrical lenses. As shown in the different views, the propagation profiles in the different planes, the XZ plane and the YZ plane, differ reflecting the different aspect ratio of the shaped propagation beam, where in this example, the shaping of the propagation beam is affected by the cylindrical lenses. In the XZ (upper) view, cylindrical lenses 708 and 710 have no power and the collimated light passes through in the axial plane with no change in size. In the YZ (lower) view, the cylindrical lenses 708 and 710 have power and the collimated beam size along Y after 710 is different than the collimated beam size along Y before 708. The presence of 706 results in anamorphic magnification of the image of 702 at 712.

FIG. 13 illustrates an optical imager apparatus 800 that uses a similar type beam shaping group 806 to that of group 706, where the apparatus 800 includes an optical relay stage 816 between the group 806 and the focusing objective stage 814 and far field positioned sample 812, where the optical relay stage 816 may be formed in a similar manner to that of FIG. 5 (e.g., optical relay stage 510).

Generally, with the present techniques, where a beam shaping group having given design divergence angles are imaged on or proximal to an objective pupil, by a unit-conjugate optical relay stage, the divergence angle at the objective pupil will equal the divergence angle out of the beam shaping group. In an example, the magnification of the optical relay stage may be chosen to transform the divergence angle out of the beam shaping group to a different divergence angle into the objective pupil. This allows the divergence of off-the-shelf beam shaping group to be transformed to a target value. For example, the nominal divergence of an Edmund Stock #86-844 is ±3.2°. When a ±3.2° fan is directed into a focusing objective stage (e.g., a microscope objective) having an Effective Focal Length (EFL) of 10 mm, a line forms at the focus of the objective. The length of the line can be calculated by 2 (10 mm) Tan[3.2°], or approximately 1.1 mm. If the target line length is 1.2 mm, such an off-the-shelf part shapes beams into lines that are 100 um shorter than the desired 1.2 mm. However, if the magnification of the optical relay stage is chosen to be 1/1.1, then the angle at the objective pupil will be approximately 3.5°. The length of the line can be calculated by 2 (10) mm Tan[3.5°], or approximately 1.2 mm. Thus, the relay has transformed the output of an off-the-shelf beam shaping group into an output that has been adapted to meet different requirements.

While fixed magnification optical relay stages can be used to transform nominal off-the-shelf fans into nominal alternative fans, variation of beam shaping groups will still result in variation of line length, i.e., of the substantially rectangular cross-section sampling beam at the far field. Variation of objective focal length will also result in variation of line length. Therefore, in another example, the optical relay stage may include a lens stage of which the focal length can be varied continuously by moving one or more of the lens components of the stage along the axis with one of the focal points of said zoom lens being maintained in a fixed plane. In such an adjustable optical relay stage, the afocality or deviation from afocality may be maintained while the magnification of the relay is tuned. When such an optical relay stage is used to transform off-the-shelf fans into alternative fans, the focal length of the zoom lens may be tuned to compensate for variation of the beam shaping means.

In various examples, the techniques herein include optical imager apparatuses and methods for formatting light at two different distances within a sample. That is, in various implementations, an apparatus is provided that can generate beams for probing a sample where the beam is characterized by having a substantially rectangular cross-section beam profile at different depths within the sample, which allows for more accurate probing throughout the entire sample.

Figure 14:
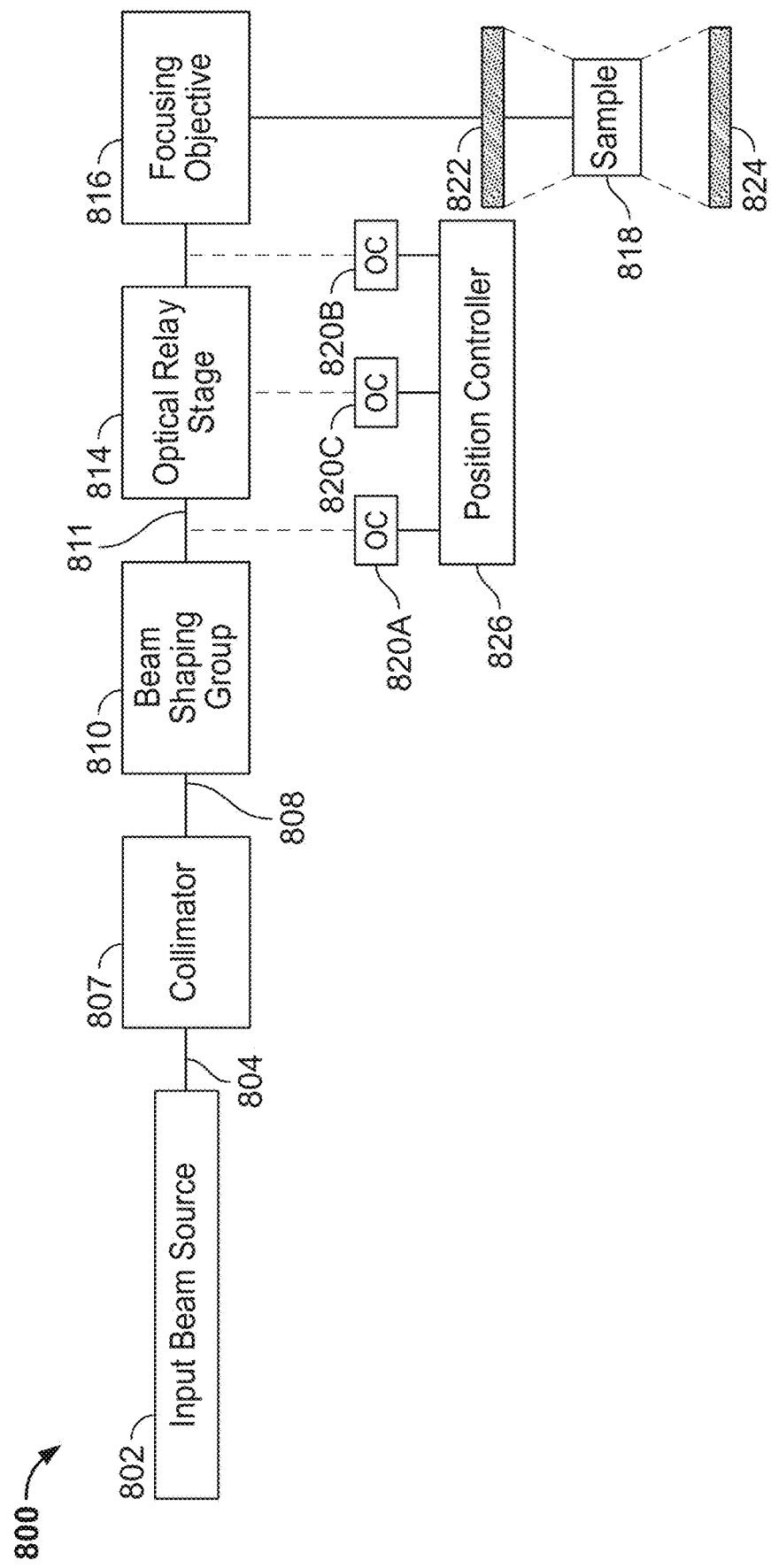
FIG. 14 illustrates an implementation of an optical imager apparatus having an optical compensator in accordance with the teachings of this disclosure.

FIG. 14 illustrates an optical imager apparatus 800 having an input beam source 802 generating an input beam 804, a collimator stage 807 generating a substantially collimated input beam 808 and a beam shaping group 810 generating a shaped propagation beam 811. The apparatus 800 further includes an optical relay stage 814 that provides the shaped propagation beam to a focusing objective stage 816 for probing a sample 818. The optical image apparatus 800 further includes an optical compensator 820 that may be positioned in the apparatus 800 to control the sampling focal plane of the objective stage 816. In the implementation shown, the optical compensator 820 may be controllably provided at one of three different positions: before the optical relay stage 814, shown as OC 820A; after the optical relay stage 814 shown as OC 820B; or within the optical relay stage 814 as shown as OC 820C. In other examples, the optical compensator may be positioned elsewhere in the apparatus.

In various examples, the optical compensator may be a plane-parallel plate formed of refractive material. In various other examples, the optical compensator may be a lens. The optical compensator is designed to have a first compensation position or state such that the focusing objective stage is to produce a substantially rectangular cross-section sampling beam 822 at an upper surface or region of the sample. Further the compensator is designed to have a second compensation position or state such that the focusing objective stage is to produce a substantially rectangular cross-section sampling beam 824 to probe a bottom surface or region of the sample. The optical compensator is designed and positioned within the apparatus 800 to maintain substantially the same uniform illumination profile of a probe beam at both the upper and bottom portions of the sample. FIGS. 15 and 16 illustrate an example Zemax image of a generated sample beam, formed of two input beam fibers as the beam source, and in particular showing the uniform substantially rectangular cross-section of the sample beam at an upper surface of a sample (FIG. 15) and at a bottom surface of the sample (FIG. 16), each achieved by controlling changing the position or state of an optical compensator in an example.

The optical compensator may be mechanically controllable between the first compensation position and the second compensation position. The optical compensator may be electrically controllable between the first compensation position and the second compensation position. Toward that end, a position controller 826 (FIG. 14) is provided in the implementation shown, wherein the positioner controller is coupled to the optical compensator. In some examples, the position controller 826 is designed to controllably (i) insert the optical compensator into a beam path for receiving the shaped propagation beam and for affecting the shaped propagation beam path to probe one of an upper surface or a lower surface of the sample and (ii) remove the optical compensator from the beam path for affecting the shaped propagation beam path to probe the other of the lower surface or upper surface of the sample. In some examples, the position controller 826 is designed to alter the state of the optical compensator between a first state and a second state to select between generating the substantially rectangular cross-section sampling beam at the upper surface or at the lower surface of the sample. For example, the optical compensator may be an electro-optic refractive element that can change the optical path length in response to an applied voltage from the position controller 826.

While not shown, the position controller 826 may include one or more processors and one or more computer readable memories storing instructions that may be executed by the one or more processors to perform various functions including the disclosed implementation. The position controller may include a user interface and a communication interface, electrically and/or communicatively coupled to the one or more processors, as are the one or more memories.

In an implementation, the user interface may be adapted to receive input from a user and to provide information to the user associated with the operation of the apparatus 800. The user interface may include a touch screen, a display, a keyboard, a speaker(s), a mouse, a track ball, and/or a voice recognition system. The touch screen and/or the display may display a graphical user interface (GUI).

In an implementation, a communication interface is adapted to enable communication between the apparatus 800 and a remote system(s) (e.g., computers) via a network(s). The network(s) may include the Internet, an intranet, a local-area network (LAN), a wide-area network (WAN), a coaxial-cable network, a wireless network, a wired network, a satellite network, a digital subscriber line (DSL) network, a cellular network, a Bluetooth connection, a near field communication (NFC) connection, etc. Some of the communications provided to the remote system may be associated with analysis results, imaging data, etc. generated or otherwise obtained by the apparatus 100.

The one or more processors of the controller 826 may include one or more of a processor-based system(s) or a microprocessor-based system(s). In some implementations, the one or more processors includes one or more of a programmable processor, a programmable controller, a microprocessor, a microcontroller, a graphics processing unit (GPU), a digital signal processor (DSP), a reduced-instruction set computer (RISC), an application specific integrated circuit (ASIC), a field programmable gate array (FPGA), a field programmable logic device (FPLD), a logic circuit, and/or another logic-based device executing various functions including the ones described herein.

The one or more memories can include one or more of a semiconductor memory, a magnetically readable memory, an optical memory, a hard disk drive (HDD), an optical storage drive, a solid-state storage device, a solid-state drive (SSD), a flash memory, a read-only memory (ROM), erasable programmable read-only memory (EPROM), electrically erasable programmable read-only memory (EEPROM), a random-access memory (RAM), a non-volatile RAM (NVRAM) memory, a compact disc (CD), a compact disc read-only memory (CD-ROM), a digital versatile disk (DVD), a Blu-ray disk, a redundant array of independent disks (RAID) system, a cache, and/or any other storage device or storage disk in which information is stored for any duration (e.g., permanently, temporarily, for extended periods of time, for buffering, for caching).

FIGS. 17A and 17B illustrate another example optical imager apparatus 900 having a collimator 902 and beam shaping group (BSG) 904, optical relay stage 906 formed of a first lens group 1 (input lens stage 908) and a second lens group 2 (output lens stage 910), and an optical compensator 912 in two different positions/states, a first position/state to probe a bottom of a sample 922 (FIG. 17B) and a second position/state to probe a top of the sample 922 (FIG. 17A). In the illustrated example, the optical compensator 912 has changed states between FIGS. 17A and 17B, the later showing no or less optical path length introduced to the beam within the optical relay stage 906, the former showing greater optical path length introduced to the beam within the optical relay stage 906, for example using an electro-optical compensator or any similar optical control means. Thus, the optical compensator may be an optical element electrically controllable to switch from a first optical state to a second optical state to affect optical compensation, such as a liquid lens. In other examples, the result of FIG. 17A may be achieved by removing the optical compensator 912 from the optical path within the optical relay stage 906.

In different embodiments, right angle reflecting mirrors 920 and 918 may also be used as shown, as well as a wavelength dependent reflectors 914 and 916 which may be used to filter unwanted wavelength components in the beam from propagating to a sample 922 via a final right angle reflector 924.

Figures 18A, 18B:
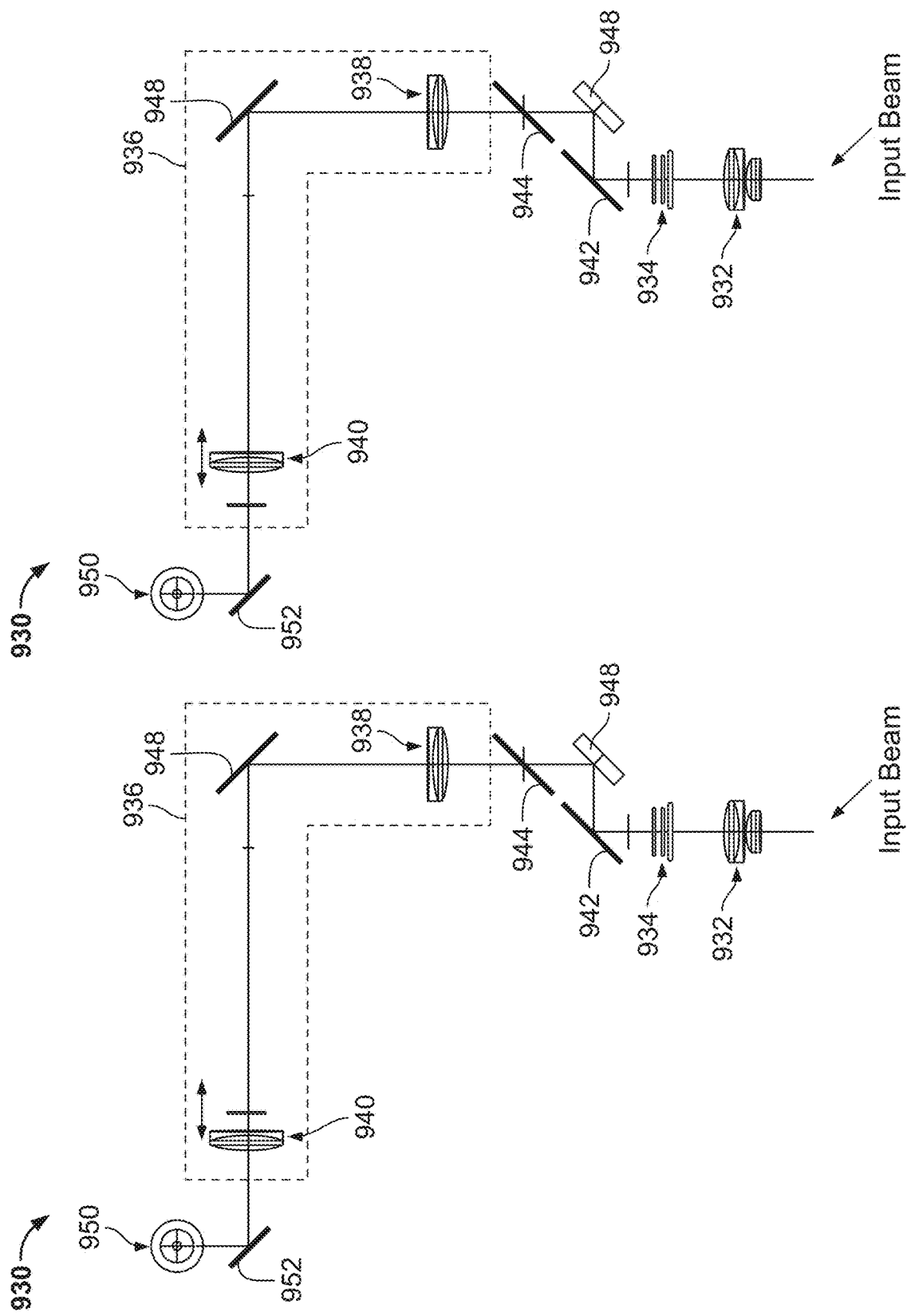
FIGS. 18A and 18B illustrate an optical imager apparatus with a relay output lens group at different positions, respectively for an implementation in accordance with the teachings of this disclosure.

FIGS. 18A and 18B illustrate another example optical imager apparatus 930 having a collimator 932 and a beam shaping group (BSG) 934, optical relay stage 936 formed of a first lens group 1 (input lens stage 938) and a second lens group 2 (output lens stage 940) that is movable between two different positions, a first position to probe a bottom of a sample 950 (FIG. 18B) and a second position to probe a top of the sample (FIG. 18A) 950. Changes in optical compensation, in the apparatus 930 are achieved by changing the position of a lens group of the optical relay stage 936. As with optical stage 900, in the illustrated example, right angle reflecting mirrors 948 and 946 may also be used as shown, as well as a wavelength dependent reflectors 942, 944 which may be used to filter unwanted wavelength components in the beam from propagating to the sample 950 via a final right angle reflector 952.

Figure 19A:
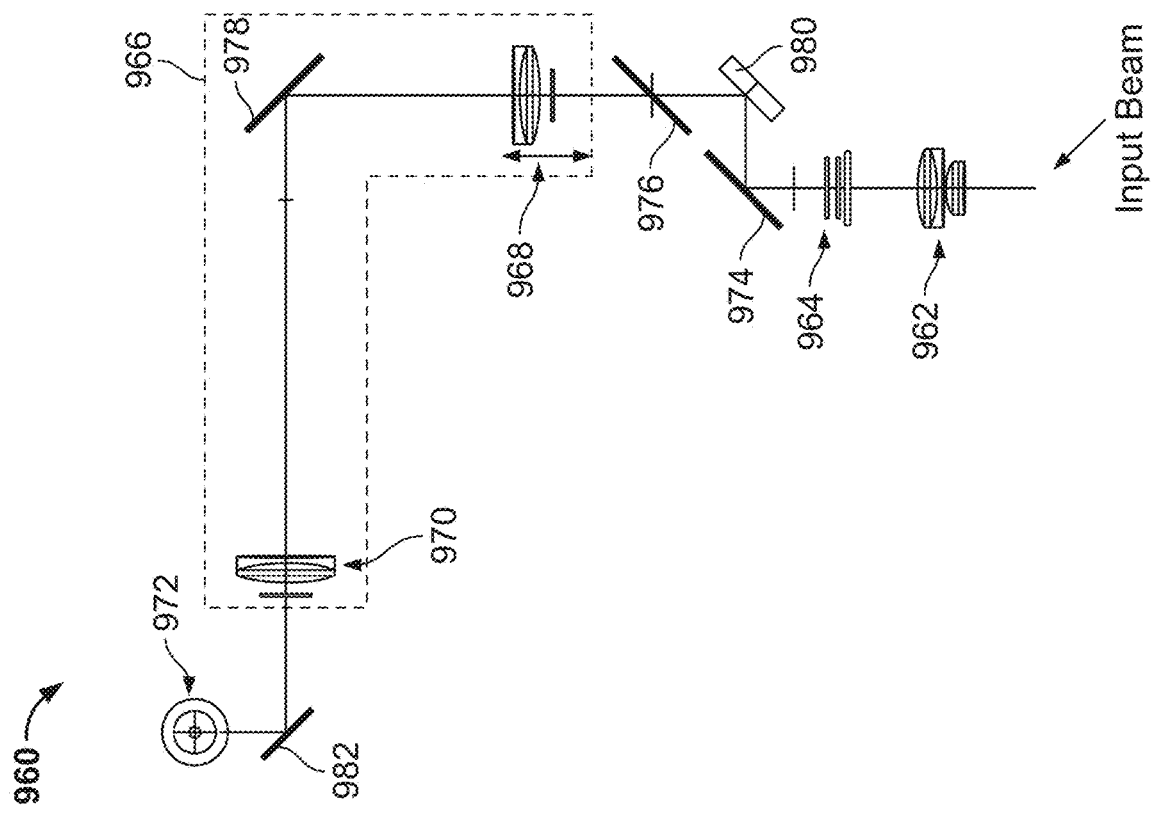
FIGS. 19A and 19B illustrate of an optical imager apparatus with a relay input lens group at different positions, respectively for an implementation in accordance with the teachings of this disclosure.
Figure 19B:
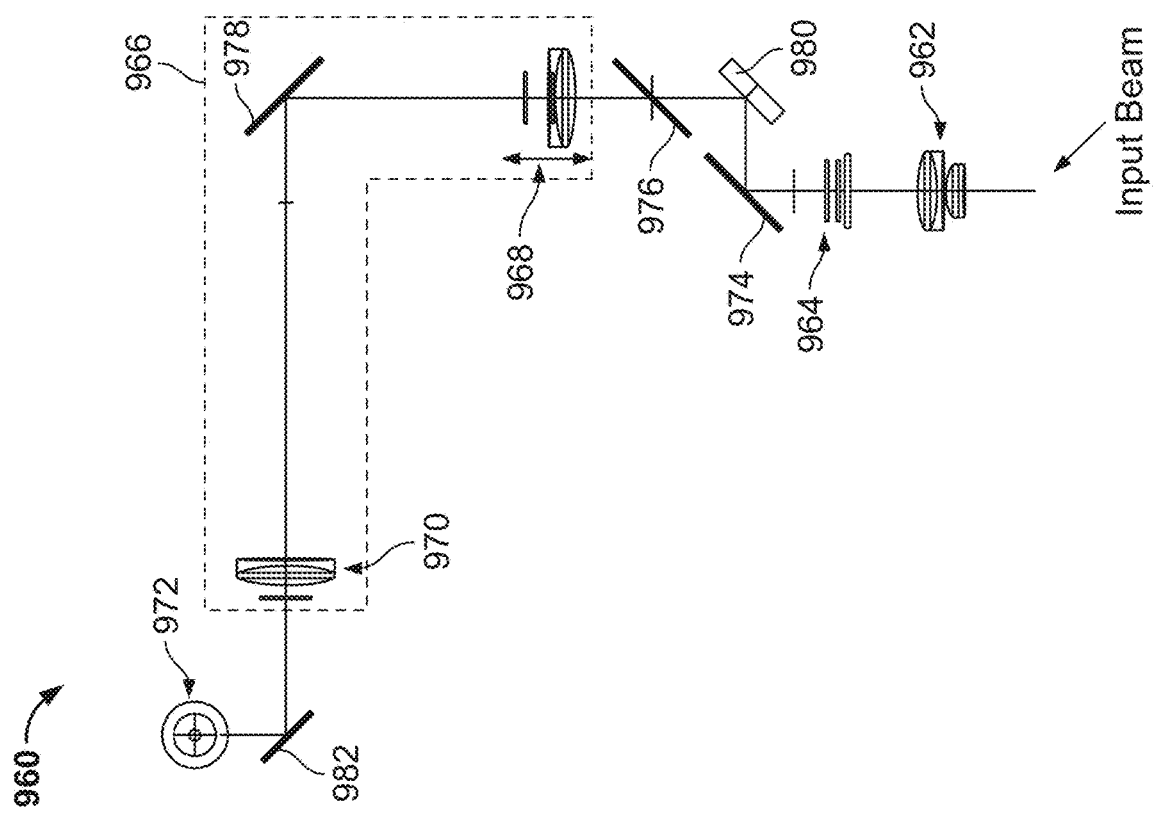

FIGS. 19A and 19B illustrate another example optical imager apparatus 960 having a collimator 962, a beam shaping group (BSG) 964, and an optical relay stage 966 formed of a first lens group 1 (input lens stage 968) and a second lens group 2 (output lens stage 970), where the relay input lens group 968 is movable between two different positions, a first position to probe a bottom of a sample 972 (FIG. 19B) and a second position to probe a top of the sample (FIG. 19A). As with the optical stage 900, in the illustrated example, right angle reflecting mirrors 980 and 978 may also be used as shown, as well as one or more wavelength dependent reflectors 974, 976 which may be used to filter unwanted wavelength components in the beam from propagating to the sample 972 via a final right angle reflector 982.

Figure 20:
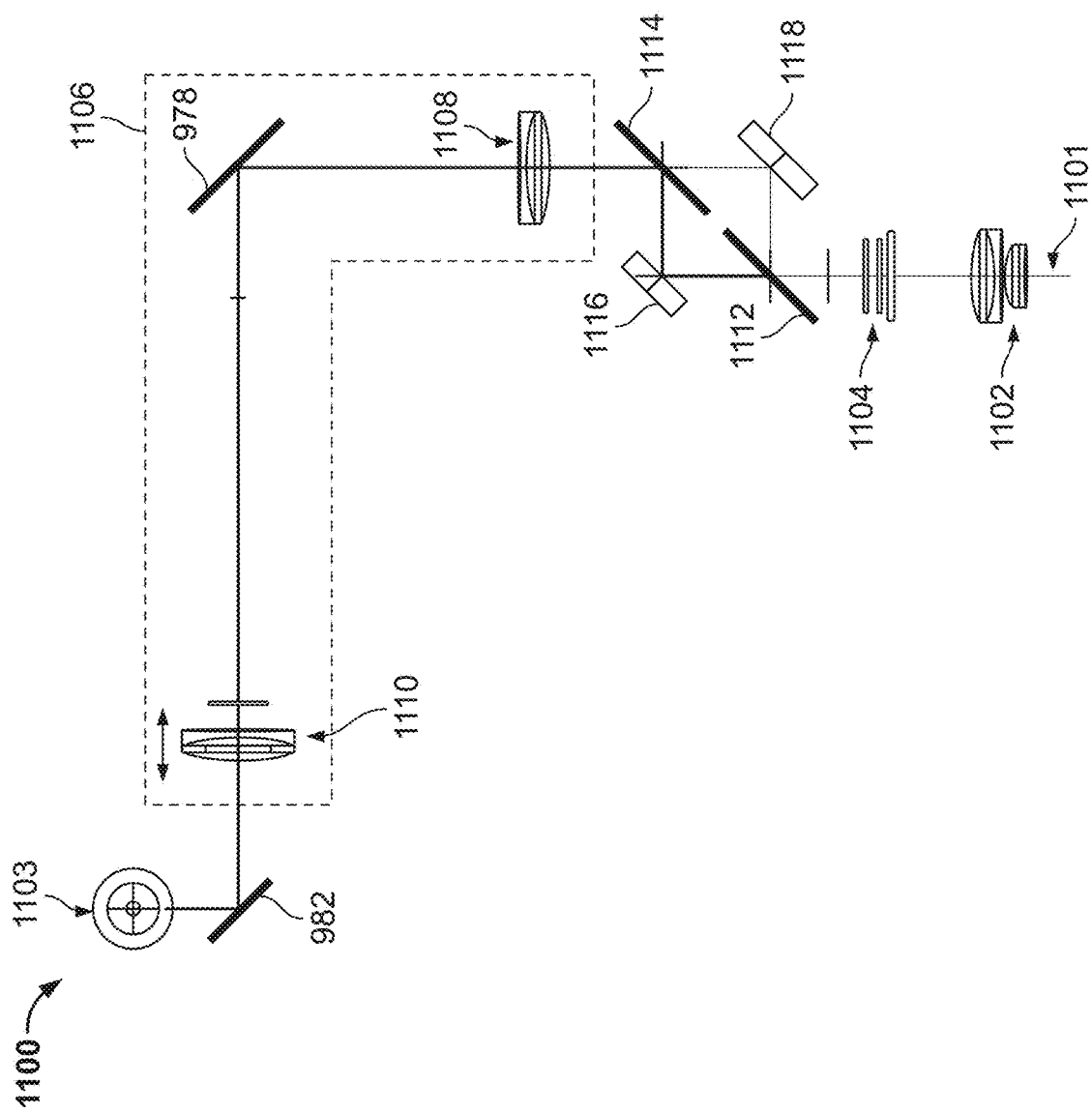
FIG. 20 illustrates schematic diagrams of an optical imager apparatus with a dichroic configuration for an implementation in accordance with the teachings of this disclosure.

FIG. 20 illustrates another example optical imager apparatus 1100 having a dichroic arrangement that may be used to direct two different wavelength input beams 1101 arriving in the same input fiber beam source to different locations in a sample 1103. A collimator 1102 receives the two-wavelength input beam and generates a collimated output beam having both wavelengths. As with other examples described herein, the beam shaping group (BSG) 1104 formats the collimated beam into a shaped propagation beam having a substantially rectangular cross-section in a far field for each wavelength. An optical relay stage 1106 is formed of a first lens group 1 (input lens stage 1108) and a second lens group 2 (output lens stage 1110), where, in the illustrated example, the second relay input lens group 1110 is movable between two different positions, for probing across the sample 1103, e.g., from a bottom of the sample 1103 to the top of the sample 1103. Dichroic right angle reflecting mirrors 1112 and 1114 are provided each to reflect a different one of the wavelengths in the input beam(s) 1101 and to transmit the other of the wavelengths. Two different mirrors 1116 and 1118 are provided to reflect incident light. For example, the BSG 1104 may format a beam, while mirror 1112 reflects blue wavelength components and transmits green wavelength components, mirror 1118 reflects blue wavelength components, mirror 1116 reflects green wavelength components, and mirror 1114 reflects green wavelength components and transmits blue wavelength components. The angles of the mirrors 1116 and 1118 are set to produce a specific angle between the blue wavelength and green wavelength beam components after they exit the mirror 1114. The different angles reach the objective (optionally through a relay) and the position of the shaped beams at the focus of the objective is determined by the angle of the beams relative to the objective axis.

Any of the foregoing examples shown in FIGS. 17A-17B, 18A-18B, 19A-19B, and/or 20 may be implemented with any of the implementations described above in reference to FIGS. 1-14.

Figure 21:
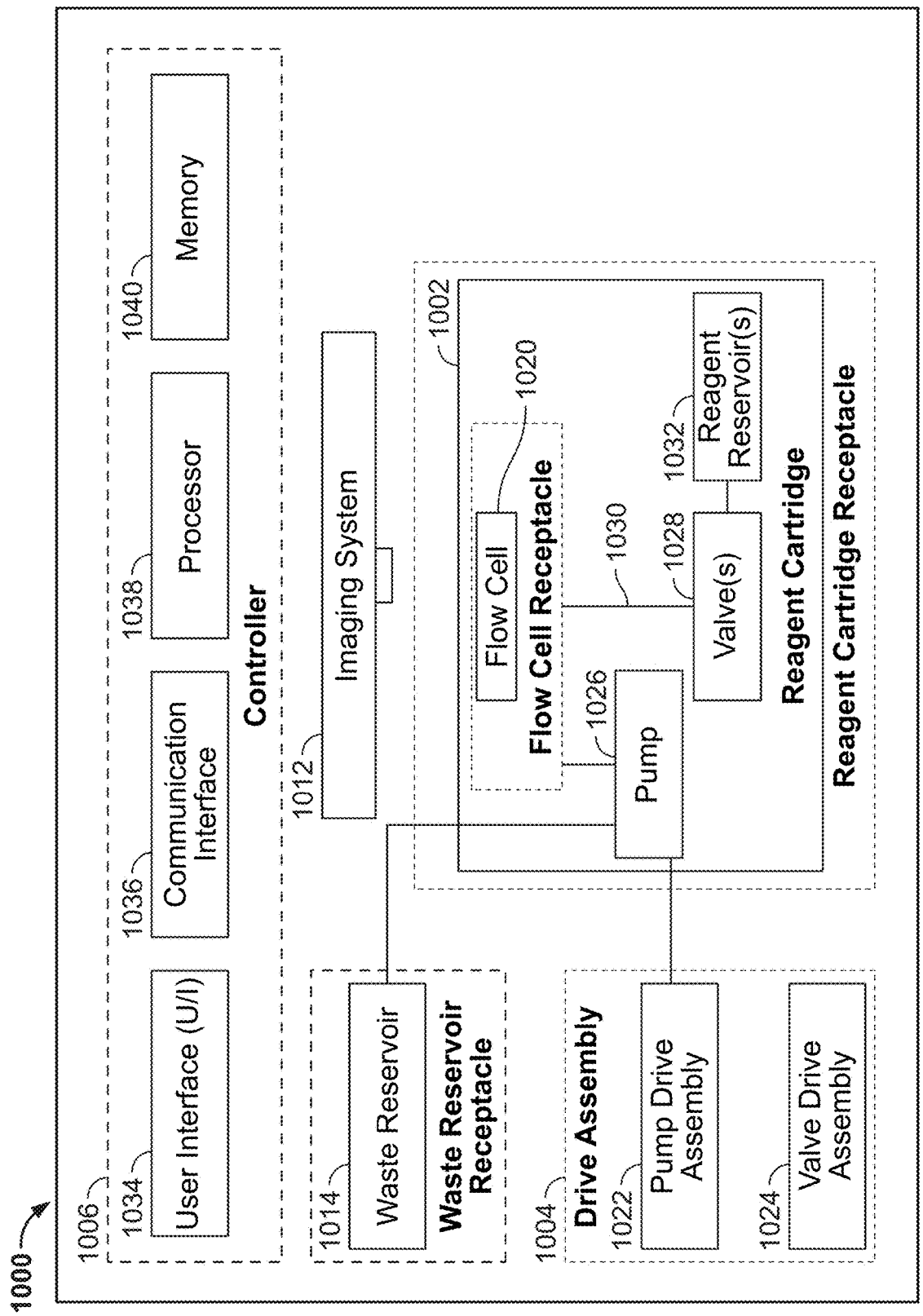
FIG. 21 illustrates a schematic diagram of an implementation of a system in accordance with the teachings of this disclosure.

FIG. 21 illustrates a schematic diagram of an implementation of a system 1000 in accordance with the teachings of this disclosure. The system 1000 can be used to perform an analysis on one or more samples of interest. The sample may include one or more DNA clusters that have been linearized to form a single stranded DNA (sstDNA). In the implementation shown, the system 1000 receives a reagent cartridge 1002 and includes, in part, a drive assembly 1004 and a controller 1006. The system 1000 also includes, an imaging system 1012, and a waste reservoir 1014. In other implementations, the waste reservoir 1014 may be included with the reagent cartridge 1002. The imaging system 1012 include any one or more of the optical imager apparatus 100, 200, 300, 400, 800, 900 disclosed herein. The controller 1006 is electrically and/or communicatively coupled to the drive assembly 1004, and the imaging system 1012 and causes the drive assembly 1004, and/or the imaging system 1012 to perform various functions as disclosed herein.

The reagent cartridge 1002 carries the sample of interest that can be loaded into channels of a flow cell 1020. The drive assembly 1004 interfaces with the reagent cartridge 1002 to flow one or more reagents (e.g., A, T, G, C nucleotides) through the flow cell 1020 that interact with the sample.

In an implementation, a reversible terminator is attached to the reagent to allow a single nucleotide to be incorporated onto a growing DNA strand. In some such implementations, one or more of the nucleotides has a unique fluorescent label that emits a color when excited. The color (or absence thereof) is used to detect the corresponding nucleotide. In the implementation shown, the imaging system 1012 excites one or more of the identifiable labels (e.g., a fluorescent label) and thereafter obtains image data for the identifiable labels. The labels may be excited by incident light and/or a laser and the image data may include one or more colors emitted by the respective labels in response to the excitation. The image data (e.g., detection data) may be analyzed by the system 1000. The imaging system 1012 may be a fluorescence spectrophotometer including an objective lens and/or a solid-state imaging device. The solid-state imaging device may include a charge coupled device (CCD) and/or a complementary metal oxide semiconductor (CMOS).

After the image data is obtained, the drive assembly 1004 interfaces with the reagent cartridge 1002 to flow another reaction component (e.g., a reagent) through the reagent cartridge 1002 that is thereafter received by the waste reservoir 1014 and/or otherwise exhausted by the reagent cartridge 1002. The reaction component performs a flushing operation that chemically cleaves the fluorescent label and the reversible terminator from the sstDNA. The sstDNA is then ready for another cycle.

Referring now to the drive assembly 1004, in the implementation shown, the drive assembly 1024 includes a pump drive assembly 1022, a valve drive assembly 1024, and an actuator assembly 192. The pump drive assembly 1022 interfaces with a pump 1026 to pump fluid through the reagent cartridge 1002 and/or the flow cell 1020 and the valve drive assembly 1024 interfaces with a valve 1028 to control the position of the valve 1028. The interaction between the valve 1028 and the valve drive assembly 1024 selectively actuates the valve 1028 to control the flow of fluid through fluidic lines 1030 of the reagent cartridge 1002. One or more of the fluidic lines 1030 fluidically couple one or more reagent reservoirs 1032 and the flow cell 1020. One or more of the valves 1028 may be implemented by a valve manifold, a rotary valve, a pinch valve, a flat valve, a solenoid valve, a reed valve, a check valve, a piezo valve, etc.

Referring to the controller 1006, in the implementation shown, the controller 1006 includes a user interface 1034, a communication interface 1036, one or more processors 1038, and a memory 1040 storing instructions executable by the one or more processors 1038 to perform various functions including the disclosed implementations. The user interface 1034, the communication interface 1036, and the memory 1040 are electrically and/or communicatively coupled to the one or more processors 1038.

In an implementation, the user interface 1034 receives input from a user and provides information to the user associated with the operation of the system 1000 and/or an analysis taking place. The user interface 1034 may include a touch screen, a display, a key board, a speaker(s), a mouse, a track ball, and/or a voice recognition system. The touch screen and/or the display may display a graphical user interface (GUI).

In an implementation, the communication interface 1036 enables communication between the system 1000 and a remote system(s) (e.g., computers) via a network(s). The network(s) may include an intranet, a local-area network (LAN), a wide-area network (WAN), the intranet, etc. Some of the communications provided to the remote system may be associated with analysis results, imaging data, etc. generated or otherwise obtained by the system 1000. Some of the communications provided to the system 1000 may be associated with a fluidics analysis operation, patient records, and/or a protocol(s) to be executed by the system 1000.

The one or more processors 1038 and/or the system 1000 may include one or more of a processor-based system(s) or a microprocessor-based system(s). In some implementations, the one or more processors 1038 and/or the system 1000 includes a reduced-instruction set computer(s) (RISC), an application specific integrated circuit(s) (ASICs), a field programmable gate array(s) (FPGAs), a field programmable logic device(s) (FPLD(s)), a logic circuit(s), and/or another logic-based device executing various functions including the ones described herein.

The memory 1040 can include one or more of a hard disk drive, a flash memory, a read-only memory (ROM), erasable programmable read-only memory (EPROM), electrically erasable programmable read-only memory (EEPROM), a random-access memory (RAM), non-volatile RAM (NVRAM) memory, a compact disk (CD), a digital versatile disk (DVD), a cache, and/or any other storage device or storage disk in which information is stored for any duration (e.g., permanently, temporarily, for extended periods of time, for buffering, for caching).

Figure 22:
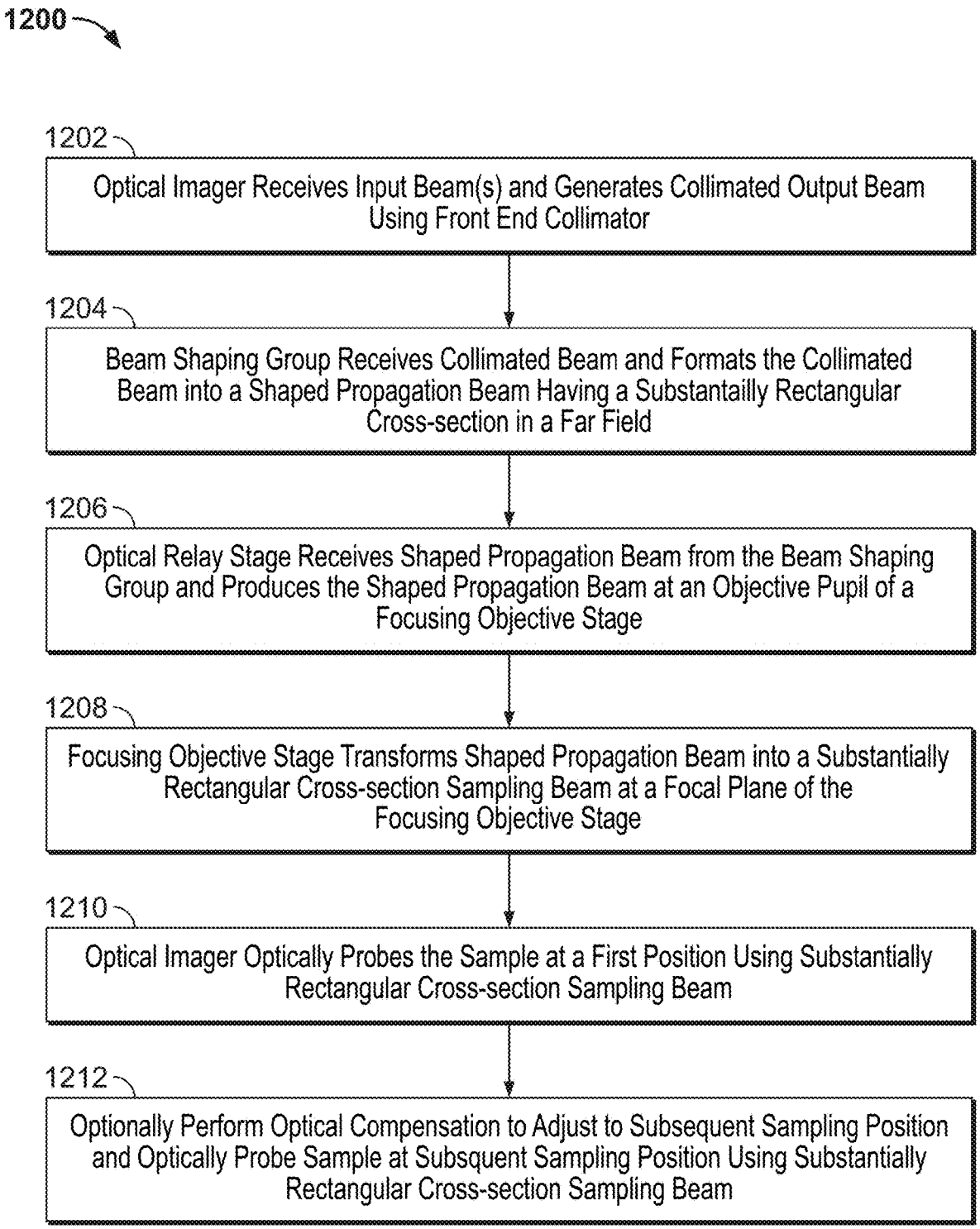
FIG. 22 illustrates a flow diagram of an example process that may be implemented by an apparatus, in particular an optical imager, to analyze one or more samples of interest.

FIG. 22 illustrates a flow diagram of an example process 1200 that may be implemented by an apparatus, in particular an optical imager, to analyze one or more samples of interest. The sample may include one or more DNA clusters, such as a DNA cluster that has been linearized to form a single stranded DNA (sstDNA). At a block 1202, an apparatus receives an input beam and generates a collimated output beam using a front-end collimator. At a block 1204, the output of the collimated beam is provided to a beam shaping group that formats the collimated beam into a shaped propagation beam having a substantially rectangular cross-section in a far field. For example, the beam shaping group may be an imaging integrator formed of two different elements each an array of cylindrical microlenses. At a block 1206, the shaped propagation beam is provided to an optical relay stage that produces the shaped propagation beam to an objective pupil of a focusing objective stage, where, at a block 1208, the shaped propagation beam is transformed into a substantially rectangular cross-section sampling beam at a focal plane of the focusing objective stage. The optical relay stage may alternatively be omitted. At a block 1210, the apparatus optically probes a sample at a first position, using the substantially rectangular cross-section sampling beam. Further, optionally, at a block 1212, an optical compensation is performed to adjust the sampling position of the substantially rectangular cross-section sampling beam to optically probe the sample at a second position, different than the first. The process of block 1212 may be formed multiple times at different positions, continuously across different positions, or at one position, before the process 1200 terminates with the sample having been optically probed at least one time with the substantially rectangular cross-section sampling beam. The block 1212 may be implemented using any number of the compensation techniques herein, including introducing an optical compensator into an optical relay stage, or before or after such stage. Compensation may be achieved by changing the position of an lens group of the optical relay stage.

Another process begins by an input beam being having a first beam over a first wavelength range and having a second beam over a second wavelength range, different than the first wavelength range. The input beam may additionally or alternatively be generated using a two-input beam source. The collimator receiving an input beam from a fiber beam source and the collimator producing a substantially collimated beam from the input beam. The substantially collimated beam is received from the collimator at a beam shaping group comprising one or more optical elements and the substantially collimated beam is formatted by the beam shaping group into a shaped propagation beam having a substantially rectangular cross-section in a far field and the shaped propagation beam is received at a focusing objective stage including an objective pupil. The shaped propagation beam is transformed into a substantially rectangular cross-section sampling beam at or near a focal plane of the focusing objective stage and a sample is optically probed using the focusing objective stage.

An apparatus, comprising: a collimator at an input end positioned to receive an input beam from a fiber beam source and to produce a substantially collimated beam; a beam shaping group comprising one or more optical elements and positioned to receive the substantially collimated beam from the collimator and format the substantially collimated beam into a shaped propagation beam having a substantially rectangular cross-section in a far field; and a focusing objective stage including an objective pupil for receiving the shaped propagation beam and positioned to transform the shaped propagation beam into a substantially rectangular cross-section sampling beam at or near a focal plane of the focusing objective stage for optically probing a sample.

In an example, the apparatus further includes: an optical relay stage positioned between the beam shaping group and the focusing objective stage for imaging the shaped propagation beam from the beam shaping group onto the objective pupil of the focusing objective stage.

The apparatus of any one or more of the preceding examples and/or any one or more of the examples disclosed below, the optical relay stage comprises an input lens stage positioned to receive the shaped propagation beam from the beam shaping group and an output lens stage positioned to produce the shaped propagation beam to the objective pupil of the focusing objective stage.

The apparatus of any one or more of the preceding examples and/or any one or more of the examples disclosed below, the input lens stage and the output lens stage form a focusing element pair defining an intermediate image plane within the optical relay stage.

The apparatus of any one or more of the preceding examples and/or any one or more of the examples disclosed below, the optical relay stage having a beam affecting element at the intermediate image plane.

The apparatus of any one or more of the preceding examples and/or any one or more of the examples disclosed below, the beam affecting element is an optical mask.

The apparatus of any one or more of the preceding examples and/or any one or more of the examples disclosed below, the beam affecting element is a despeckling element.

The apparatus of any one or more of the preceding examples and/or any one or more of the examples disclosed below, a position of at least one of the input lens stage and the output lens stage is adjustable.

The apparatus of any one or more of the preceding examples and/or any one or more of the examples disclosed below, the apparatus further includes a Powell lens positioned before to the optical relay stage.

The apparatus of any one or more of the preceding examples and/or any one or more of the examples disclosed below, the apparatus further includes a Lineman lens positioned before to the optical relay stage.

The apparatus of any one or more of the preceding examples and/or any one or more of the examples disclosed below, the optical relay stage is afocal.

The apparatus of any one or more of the preceding examples and/or any one or more of the examples disclosed below, the optical relay stage is a fixed magnification relay.

The apparatus of any one or more of the preceding examples and/or any one or more of the examples disclosed below, the optical relay stage is a variable magnification relay.

The apparatus of any one or more of the preceding examples and/or any one or more of the examples disclosed below, the beam shaping group is an integrator.

The apparatus of any one or more of the preceding examples and/or any one or more of the examples disclosed below, the integrator is an imaging integrator formed of two arrays of cylindrical microlenses positioned in series.

The apparatus of any one or more of the preceding examples and/or any one or more of the examples disclosed below, wherein the microlenses are cylindrical lenses.

The apparatus of any one or more of the preceding examples and/or any one or more of the examples disclosed below, wherein the microlenses each have different focal lengths along an x-direction and along a y-direction.

The apparatus of any one or more of the preceding examples and/or any one or more of the examples disclosed below, the integrator is a non-imaging integrator formed of one array of microlenses.

The apparatus of any one or more of the preceding examples and/or any one or more of the examples disclosed below, wherein the beam shaping group comprises integral diffractive features.

The apparatus of any one or more of the preceding examples and/or any one or more of the examples disclosed below, wherein the beam shaping group comprises integral diffuser features.

The apparatus of any one or more of the preceding examples and/or any one or more of the examples disclosed below, wherein the integrator is an imaging integrator formed of microlenses, wherein the microlenses are cylindrical lenses.

The apparatus of any one or more of the preceding examples and/or any one or more of the examples disclosed below, wherein the cylindrical lenses are configured to impose divergence in one axial direction of the microlenses and not in an orthogonal direction of the microlenses.

The apparatus of any one or more of the preceding examples and/or any one or more of the examples disclosed below, the beam shaping group comprises a diffractive optical element.

The apparatus of any one or more of the preceding examples and/or any one or more of the examples disclosed below, the beam shaping group comprises a refractive optical element, a combination of a refractive optical element and a diffractive optical element, or a refractive optical element with integral diffractive or diffusive features.

The apparatus of any one or more of the preceding examples and/or any one or more of the examples disclosed below, the beam shaping group transforms the collimated beam into the shaped propagation beam having a uniform illumination in the far field over a rectangle having a ratio 8 to 1.

The apparatus of any one or more of the preceding examples and/or any one or more of the examples disclosed below, the beam shaping group transforms the collimated beam into the shaped propagation beam having a uniform illumination in the far field over a rectangle having a ratio 10 to 1.

The apparatus of any one or more of the preceding examples and/or any one or more of the examples disclosed below, the beam shaping group transforms the collimated beam into the shaped propagation beam having a uniform illumination in the far field over a rectangle having a ratio 24 to 1.

The apparatus of any one or more of the preceding examples and/or any one or more of the examples disclosed below, the beam shaping group transforms the collimated beam into the shaped propagation beam having a uniform illumination in the far field over a rectangle having a ratio that matches a profile of a Time Delay and Integration (TDI) line sensor.

The apparatus of any one or more of the preceding examples and/or any one or more of the examples disclosed below, the apparatus further includes the fiber beam source.

The apparatus of any one or more of the preceding examples and/or any one or more of the examples disclosed below, the fiber beam source is a two-input beam source to generate the input beam having a first beam over a first wavelength range and having a second beam over a second wavelength range, different than the first wavelength range.

The apparatus of any one or more of the preceding examples and/or any one or more of the examples disclosed below, the fiber beam source comprises two dedicated input fibers each corresponding to one of the first beam and the second beam.

The apparatus of any one or more of the preceding examples and/or any one or more of the examples disclosed below, wherein output ends of the two dedicated input fibers are presented to the collimator with fixed spacing and with rotation about fiber cores and a collimator axis.

The apparatus of any one or more of the preceding examples and/or any one or more of the examples disclosed below, each input fiber has a substantially rectangular cross-section at an exit face.

The apparatus of any one or more of the preceding examples and/or any one or more of the examples disclosed below, the fiber beam source is a light pipe.

The apparatus of any one or more of the preceding examples and/or any one or more of the examples disclosed below, the apparatus includes an optical compensator positioned to receive the shaped propagation beam and having two compensation positions, a first compensation position such that the focusing objective stage is to produce the substantially rectangular cross-section sampling beam to probe an upper surface of the sample and a second compensation position such that the focusing objective stage is to produce the substantially rectangular cross-section sampling beam to probe a bottom surface of the sample.

The apparatus of any one or more of the preceding examples and/or any one or more of the examples disclosed below, the optical compensator is electro-mechanically controllable between the first compensation position and the second compensation position.

The apparatus of any one or more of the preceding examples and/or any one or more of the examples disclosed below, the optical compensator is electrically controllable between the first compensation position and the second compensation position.

The apparatus of any one or more of the preceding examples and/or any one or more of the examples disclosed below, the optical compensator is insertable between the beam shaping group and the focusing objective stage.

The apparatus of any one or more of the preceding examples and/or any one or more of the examples disclosed below, the apparatus includes an optical relay stage positioned between the beam shaping group and the focusing objective stage, the optical relay stage comprising an input lens stage positioned to receive the shaped propagation beam from the beam shaping group and an output lens stage positioned to produce the shaped propagation beam to the objective pupil of the focusing objective stage, wherein the optical compensator is positioned within the optical relay stage.

The apparatus of any one or more of the preceding examples and/or any one or more of the examples disclosed below, wherein the optical compensator is an optical element electrically controllable to switch from a first optical state to a second optical state to affect optical compensation.

The apparatus of any one or more of the preceding examples and/or any one or more of the examples disclosed below, the apparatus includes an optical relay stage positioned between the beam shaping group and the focusing objective stage, the optical relay stage comprising an input lens stage positioned to receive the shaped propagation beam from the beam shaping group and an output lens stage positioned to produce the shaped propagation beam to the objective pupil of the focusing objective stage, wherein the optical compensator is positioned before the optical relay stage.

The apparatus of any one or more of the preceding examples and/or any one or more of the examples disclosed below, the apparatus includes an optical relay stage positioned between the beam shaping group and the focusing objective stage, the optical relay stage comprising an input lens stage positioned to receive the shaped propagation beam from the beam shaping group and an output lens stage positioned to produce the shaped propagation beam to the objective pupil of the focusing objective stage, wherein the optical compensator is positioned after the optical relay stage.

The apparatus of any one or more of the preceding examples and/or any one or more of the examples disclosed below, the apparatus includes an optical compensator; and a positioner coupled to the optical compensator to controllably (i) insert the optical compensator into a beam path for receiving the shaped propagation beam and for affecting the shaped propagation beam path to probe one of an upper surface or a lower surface of the sample and (ii) remove the optical compensator from the beam path for affecting the shaped propagation beam path to probe the other of the lower surface or upper surface of the sample.

The apparatus of any one or more of the preceding examples and/or any one or more of the examples disclosed below, the optical compensator is a plane-parallel plate of refractive material.

The apparatus of any one or more of the preceding examples and/or any one or more of the examples disclosed below, the optical compensator is a lens.

The apparatus of any one or more of the preceding examples and/or any one or more of the examples disclosed below, the optical compensator is inserted before an optical relay stage in the beam path.

The apparatus of any one or more of the preceding examples and/or any one or more of the examples disclosed below, the optical compensator is inserted within an optical relay stage in the beam path.

The apparatus of any one or more of the preceding examples and/or any one or more of the examples disclosed below, the optical compensator is inserted after an optical relay stage in the beam.

The apparatus of any one or more of the preceding examples and/or any one or more of the examples disclosed below, the apparatus includes an optical relay stage positioned between the beam shaping group and the focusing objective stage, the optical relay stage comprising an input lens stage positioned to receive the shaped propagation beam from the beam shaping group and an output lens stage positioned to produce the shaped propagation beam to the objective pupil of the focusing objective stage, wherein the input lens stage is movable between a first position such that the focusing objective stage is to produce the substantially rectangular cross-section sampling beam to probe an upper surface of the sample and a second position such that the focusing objective stage is to produce the substantially rectangular cross-section sampling beam to probe a bottom surface of the sample.

The apparatus of any one or more of the preceding examples and/or any one or more of the examples disclosed below, the apparatus includes an optical relay stage positioned between the beam shaping group and the focusing objective stage, the optical relay stage comprising an input lens stage positioned to receive the shaped propagation beam from the beam shaping group and an output lens stage positioned to produce the shaped propagation beam to the objective pupil of the focusing objective stage, wherein the output lens stage is movable between a first position such that the focusing objective stage is to produce the substantially rectangular cross-section sampling beam to probe an upper surface of the sample and a second position such that the focusing objective stage is to produce the substantially rectangular cross-section sampling beam to probe a bottom surface of the sample.

The apparatus of any one or more of the preceding examples and/or any one or more of the examples disclosed below, the apparatus includes the fiber beam source, the apparatus having a first spacing distance between the collimator and the fiber beam source to produce the substantially rectangular cross-section sampling beam to probe an upper surface of the sample and having a second spacing distance between the collimator and the fiber beam source to produce the substantially rectangular cross-section sampling beam to probe a bottom surface of the sample.

A method of optically probing a sample, the method comprising: generating a collimated beam from an input beam; formatting, using a beam shaping group, the collimated beam into a shaped propagation beam having a substantially rectangular cross-section in a far field; providing the shaped propagation beam to an optical relay stage producing the shaped propagation beam at an objective pupil of a focusing objective stage; transforming, using the focusing objective stage, the shaped propagation beam into a substantially rectangular cross-section sampling beam at a focal plane of the focusing objective stage; probing the sample at a first position for the focal plane; and affecting optical compensation of the optical relay stage such that the focusing objective stage transforms the shaped propagation beam into substantially rectangular cross-section sampling beam at a second position for the focal plane and probing the sample at the second position The method of any one or more of the preceding examples and/or any one or more of the examples disclosed below, wherein affecting optical compensation of the optical relay stage comprises adjusting a position or an optical property of an affecting element within the optical relay stage.

The method of any one or more of the preceding examples and/or any one or more of the examples disclosed below, wherein affecting optical compensation of the optical relay stage comprises adjusting a position of an input lens stage of the optical relay stage or a position of an output lens stage of the optical relay stage.

The method of any one or more of the preceding examples and/or any one or more of the examples disclosed below, wherein the beam shaping group comprises two arrays of cylindrical microlenses.

The method of any one or more of the preceding examples and/or any one or more of the examples disclosed below, wherein the beam shaping group comprises a diffractive optical element.

The method of any one or more of the preceding examples and/or any one or more of the examples disclosed below, wherein the beam shaping group comprises a refractive optical element, a combination of a refractive optical element and a diffractive optical element, or a refractive optical element with integral diffractive features.

The method of any one or more of the preceding examples and/or any one or more of the examples disclosed below, wherein the beam shaping group transforms the collimated beam into the shaped propagation beam having a uniform illumination in the far field over a rectangle having a ratio 8 to 1.

The method of any one or more of the preceding examples and/or any one or more of the examples disclosed below, wherein the beam shaping group transforms the collimated beam into the shaped propagation beam having a uniform illumination in the far field over a rectangle having a ratio 10 to 1.

The method of any one or more of the preceding examples and/or any one or more of the examples disclosed below, The method of any one or more of the preceding examples and/or any one or more of the examples disclosed below, wherein the beam shaping group transforms the collimated beam into the shaped propagation beam having a uniform illumination in the far field over a rectangle having a ratio 24 to 1.

A method, comprising: receiving, at a collimator, an input beam from a fiber beam source; producing, by the collimator, a substantially collimated beam from the input beam; receiving the substantially collimated beam from the collimator at a beam shaping group comprising one or more optical elements; formatting, by the beam shaping group, the substantially collimated beam into a shaped propagation beam having a substantially rectangular cross-section in a far field; and receiving the shaped propagation beam at a focusing objective stage including an objective pupil; transforming the shaped propagation beam into a substantially rectangular cross-section sampling beam at or near a focal plane of the focusing objective stage; and optically probing a sample using the focusing objective stage.

The method of any one or more of the preceding examples and/or any one or more of the examples disclosed below, further comprising generating the input beam having a first beam over a first wavelength range and having a second beam over a second wavelength range, different than the first wavelength range.

The method of any one or more of the preceding examples and/or any one or more of the examples disclosed below, further comprising generating the input beam using a two-input beam source.

The method of any one or more of the preceding examples and/or any one or more of the examples disclosed below, wherein the fiber beam source comprises two dedicated input fibers each corresponding to one of the first beam and the second beam.

The method of any one or more of the preceding examples and/or any one or more of the examples disclosed below, wherein output ends of the two dedicated input fibers are presented to the collimator with fixed spacing and with rotation about fiber cores and a collimator axis.

The method of any one or more of the preceding examples and/or any one or more of the examples disclosed below, wherein affecting optical compensation of the optical relay stage comprises adjusting a position or an optical property of an affecting element within the optical relay stage.

The method of any one or more of the preceding examples and/or any one or more of the examples disclosed below, wherein the beam shaping group comprises two arrays of microlenses.

The method of any one or more of the preceding examples and/or any one or more of the examples disclosed below, wherein the beam shaping group comprises a diffractive optical element.

The method of any one or more of the preceding examples and/or any one or more of the examples disclosed below, wherein the beam shaping group comprises a refractive optical element, a combination of a refractive optical element and a diffractive optical element, or a refractive optical element with integral diffractive features.

The method of any one or more of the preceding examples and/or any one or more of the examples disclosed below, wherein the beam shaping group transforms the collimated beam into the shaped propagation beam having a uniform illumination in the far field over a rectangle having a ratio 8 to 1.

The method of any one or more of the preceding examples and/or any one or more of the examples disclosed below, wherein the beam shaping group transforms the collimated beam into the shaped propagation beam having a uniform illumination in the far field over a rectangle having a ratio 10 to 1.

The method of any one or more of the preceding examples and/or any one or more of the examples disclosed below, wherein the beam shaping group transforms the collimated beam into the shaped propagation beam having a uniform illumination in the far field over a rectangle having a ratio 24 to 1.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and proceeded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising," "including," or "having" an element or a plurality of elements having a particular property may include additional elements whether or not they have that property. Moreover, the terms "comprising," including," having," or the like are interchangeably used herein.

The terms "substantially," "approximately," and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

What is claimed is:

1. An apparatus, comprising:
    a fiber beam source comprising one or more input fibers and configured to provide one or more input beams via the one or more input fibers, wherein each of the one or more input fibers has a substantially rectangular cross-section at an exit face;
    a collimator at an input end positioned to receive an input beam from the fiber beam source and to produce a substantially collimated beam;
    a beam shaping group comprising one or more optical elements and positioned to receive the substantially collimated beam from the collimator and format the substantially collimated beam into a shaped propagation beam having a substantially rectangular cross-section in a far field; and
    a focusing objective stage including an objective pupil for receiving the shaped propagation beam and positioned to transform the shaped propagation beam into a substantially rectangular cross-section sampling beam at or near a focal plane of the focusing objective stage for optically probing a sample.

2. The apparatus of claim 1, further comprising:
    an optical relay stage positioned between the beam shaping group and the focusing objective stage for imaging the shaped propagation beam from the beam shaping group onto or near the objective pupil of the focusing objective stage.

3. The apparatus of claim 2, wherein the optical relay stage comprises an input lens stage positioned to receive the shaped propagation beam from the beam shaping group and an output lens stage positioned to produce the shaped propagation beam to the objective pupil of the focusing objective stage.

4. The apparatus of claim 3, wherein the input lens stage and the output lens stage form a focusing element pair defining an intermediate image plane within the optical relay stage.

5. The apparatus of claim 4, the optical relay stage having a beam affecting element at the intermediate image plane.

6. The apparatus of claim 5, wherein the beam affecting element is an optical mask or a despeckling element.

7. The apparatus of claim 3, wherein a position of at least one of the input lens stage and the output lens stage is adjustable.

8. The apparatus of claim 2, further comprising a Powell lens or a Lineman lens positioned before the optical relay stage.

9. The apparatus of claim 2, wherein the optical relay stage is one or more of afocal, a fixed magnification relay, or a variable magnification relay.

10. The apparatus of claim 1, wherein the fiber beam source is a two-input beam source to generate the input beam having a first beam over a first wavelength range and having a second beam over a second wavelength range, different than the first wavelength range.

11. The apparatus of claim 10, wherein the fiber beam source comprises two dedicated input fibers each corresponding to one of the first beam and the second beam.

12. The apparatus of claim 11, wherein output ends of the two dedicated input fibers are presented to the collimator with fixed spacing and with rotation about fiber cores and a collimator axis.

13. The apparatus of claim 1, wherein the fiber beam source is a light pipe.

14. The apparatus of claim 1, wherein at least one of the one or more input fibers has a square cross-section at the exit face.

15. A method, comprising:
    receiving, at a collimator, an input beam from a fiber beam source, the fiber beam source comprising one or more input beams via one or more input fibers, each of the one or more input fibers has a substantially rectangular cross-section at an exit face;
    producing, by the collimator, a substantially collimated beam from the input beam;
    receiving the substantially collimated beam from the collimator at a beam shaping group comprising one or more optical elements;
    formatting, by the beam shaping group, the substantially collimated beam into a shaped propagation beam having a substantially rectangular cross-section in a far field;
    receiving the shaped propagation beam at a focusing objective stage including an objective pupil;
    transforming the shaped propagation beam into a substantially rectangular cross-section sampling beam at or near a focal plane of the focusing objective stage; and
    optically probing a sample using the focusing objective stage.

16. The method of claim 15, further comprising generating the input beam having a first beam over a first wavelength range and having a second beam over a second wavelength range, different than the first wavelength range.

17. The method of claim 15, further comprising generating the input beam using a two-input beam source.

18. The method of claim 17, wherein the fiber beam source comprises two dedicated input fibers each corresponding to one of the first beam and the second beam.

19. The method of claim 18, wherein output ends of the two dedicated input fibers are presented to the collimator with fixed spacing and with rotation about fiber cores and a collimator axis.

20. The method of claim 15, wherein affecting optical compensation of the optical relay stage comprises adjusting a position or an optical property of an affecting element within the optical relay stage.

21. The method of claim 15, wherein the beam shaping group comprises two arrays of microlenses.

22. The method of claim 15, wherein the beam shaping group comprises a diffractive optical element.

23. The method of claim 15, wherein the beam shaping group comprises a refractive optical element, a combination of a refractive optical element and a diffractive optical element, or a refractive optical element with integral diffractive features.

24. The method of claim 15, wherein the beam shaping group transforms the collimated beam into the shaped propagation beam having a uniform illumination in the far field over a rectangle having a ratio of at least one of 8 to 1, 10 to 1, 24 to 1, between about 10 to 1 and about 20 to 1, or approximately 1.

25. The method of claim 15, wherein at least one of the one or more input fibers has a square cross-section at the exit face.

* * * * *